(12) United States Patent
Motoyama

(10) Patent No.: US 7,325,052 B1
(45) Date of Patent: Jan. 29, 2008

(54) METHOD AND SYSTEM TO ERASE DATA AFTER EXPIRATION OR OTHER CONDITION

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 539 days.

(21) Appl. No.: 10/884,109

(22) Filed: Jul. 1, 2004

Related U.S. Application Data

(63) Continuation-in-part of application No. 09/947,164, filed on Sep. 4, 2001, now Pat. No. 6,874,092, which is a continuation of application No. 09/167,184, filed on Oct. 6, 1998, now Pat. No. 6,301,670.

(51) Int. Cl.
*G06F 15/173* (2006.01)
*G06F 15/00* (2006.01)

(52) U.S. Cl. .................. 709/223; 709/224; 358/1.14; 358/1.16

(58) Field of Classification Search ........ 709/223–224; 713/300; 358/1.14–1.16, 1.1
See application file for complete search history.

(56) References Cited

U.S. PATENT DOCUMENTS

| | | | |
|---|---|---|---|
| 4,426,680 A | 1/1984 | Tague et al. | |
| 4,451,742 A | 5/1984 | Aswell | |
| 4,584,641 A | 4/1986 | Guglielmino | |
| 4,639,864 A | 1/1987 | Katzman et al. | |
| 5,007,053 A | 4/1991 | Iyer et al. | |
| 5,130,922 A | 7/1992 | Liu | |
| 5,265,159 A | 11/1993 | Kung | |
| 5,313,632 A | 5/1994 | Sekizawa et al. | |
| 5,325,523 A | 6/1994 | Beglin et al. | |
| 5,359,713 A | 10/1994 | Moran et al. | |
| 5,375,227 A | 12/1994 | Akatsu et al. | |
| 5,388,156 A | 2/1995 | Blackledge, Jr. et al. | |
| 5,414,827 A | 5/1995 | Lin | |
| 5,428,766 A | 6/1995 | Seaman | |
| 5,438,674 A | 8/1995 | Keele et al. | |

(Continued)

FOREIGN PATENT DOCUMENTS

DE 41 35 767 A 5/1993

(Continued)

OTHER PUBLICATIONS

Encryption Key Security by Electric Field Destruction of Memory Cells, International Business Corporation, Jan. 1989, 7 pages.

*Primary Examiner*—Frantz B. Jean
(74) *Attorney, Agent, or Firm*—Hickman Palermo Truong & Becker LLP; Edward A. Becker

(57) ABSTRACT

An approach for managing print data on printing devices includes deleting print data that has been stored on a printing device for at least a specified time. The deletion of the print data based on whether the print data has been stored on the printing device for at least the specified time may be performed regardless of whether the print has been processed and may be used in conjunction with other mechanisms for deleting print data on printing devices. The approach for managing print data on printing devices also includes deleting print data from printing devices when the print data has been processed at the printing device at least a specified number of times.

53 Claims, 15 Drawing Sheets

U.S. PATENT DOCUMENTS

| | | |
|---|---|---|
| 5,448,719 A | 9/1995 | Schult et al. |
| 5,457,748 A | 10/1995 | Bergum et al. |
| 5,469,573 A | 11/1995 | McGill, III et al. |
| 5,475,834 A | 12/1995 | Anglin et al. |
| 5,499,012 A | 3/1996 | Tracy et al. |
| 5,515,540 A | 5/1996 | Grider et al. |
| 5,544,356 A | 8/1996 | Robinson et al. |
| 5,630,044 A | 5/1997 | Suzuki |
| 5,638,509 A | 6/1997 | Dunphy et al. |
| 5,652,830 A * | 7/1997 | Yamamoto et al. ........ 358/1.16 |
| 5,664,089 A | 9/1997 | Byers et al. |
| 5,682,471 A | 10/1997 | Billings et al. |
| 5,761,705 A | 6/1998 | DeKoning et al. |
| 5,787,247 A | 7/1998 | Norin et al. |
| 5,794,253 A | 8/1998 | Norin et al. |
| 5,913,025 A | 6/1999 | Higley et al. |
| 5,933,584 A * | 8/1999 | Maniwa ..................... 358/1.15 |
| 5,943,688 A | 8/1999 | Fisher et al. |
| 5,991,895 A | 11/1999 | Laudon et al. |
| 6,006,311 A | 12/1999 | Armilli et al. |
| 6,009,500 A | 12/1999 | Rossi |
| 6,035,379 A | 3/2000 | Raju et al. |
| 6,088,815 A | 7/2000 | West et al. |
| 6,089,765 A * | 7/2000 | Mori .......................... 400/61 |
| 6,092,173 A | 7/2000 | Sasaki et al. |
| 6,115,132 A * | 9/2000 | Nakatsuma et al. ....... 358/1.14 |
| 6,119,209 A | 9/2000 | Bauman et al. |
| 6,138,125 A | 10/2000 | DeMoss |
| 6,160,631 A * | 12/2000 | Okimoto et al. ........... 358/1.15 |
| 6,185,507 B1 | 2/2001 | Huber et al. |
| 6,226,097 B1 * | 5/2001 | Kimura ..................... 358/1.14 |
| 6,301,670 B1 | 10/2001 | Motoyama et al. |
| 6,304,948 B1 | 10/2001 | Motoyama et al. |
| 6,665,082 B1 * | 12/2003 | Takeoka et al. ........... 358/1.15 |
| 6,975,424 B2 * | 12/2005 | Yamazaki et al. ......... 358/1.16 |

FOREIGN PATENT DOCUMENTS

| | | |
|---|---|---|
| DE | 41 35 767 A1 | 5/1993 |
| JP | 358012055 A | 1/1983 |
| JP | 361240351 A | 10/1986 |
| JP | 404205492 A | 7/1992 |
| JP | 09330272 A | 12/1997 |
| JP | 100 271 05 A | 1/1998 |
| SE | 8003932 A | 1/1982 |
| WO | WO 97/30447 A1 | 8/1997 |

* cited by examiner

Registered identifier value 420

| Header segment 422 | Device maker segment 424 | Serial number segment 426 |

Table 460

| Manufacturer | Serial Number | Assigned Date | |
|---|---|---|---|
| | | | |
| | | | |
| | | | |

462 →

464   466   468

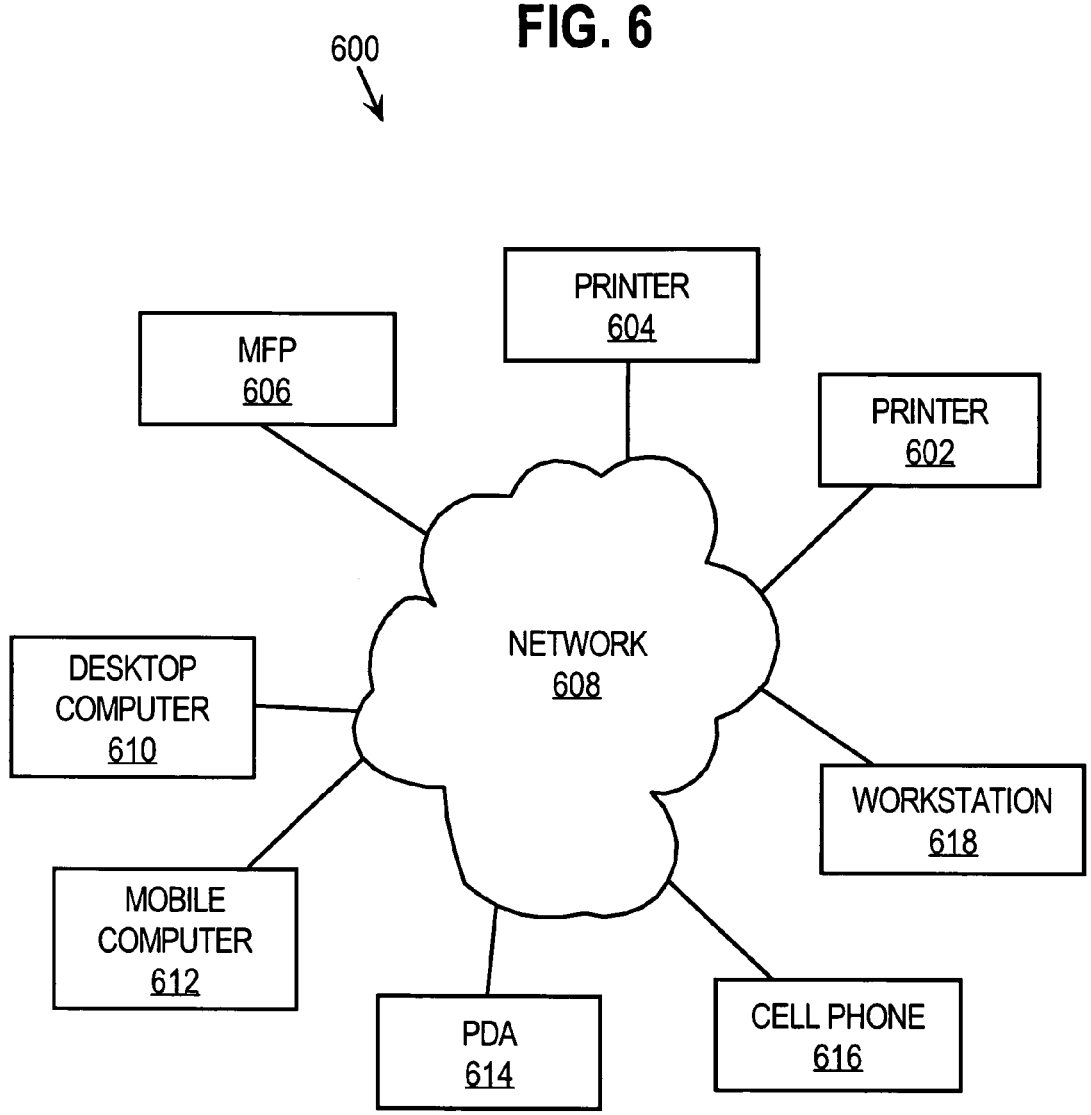

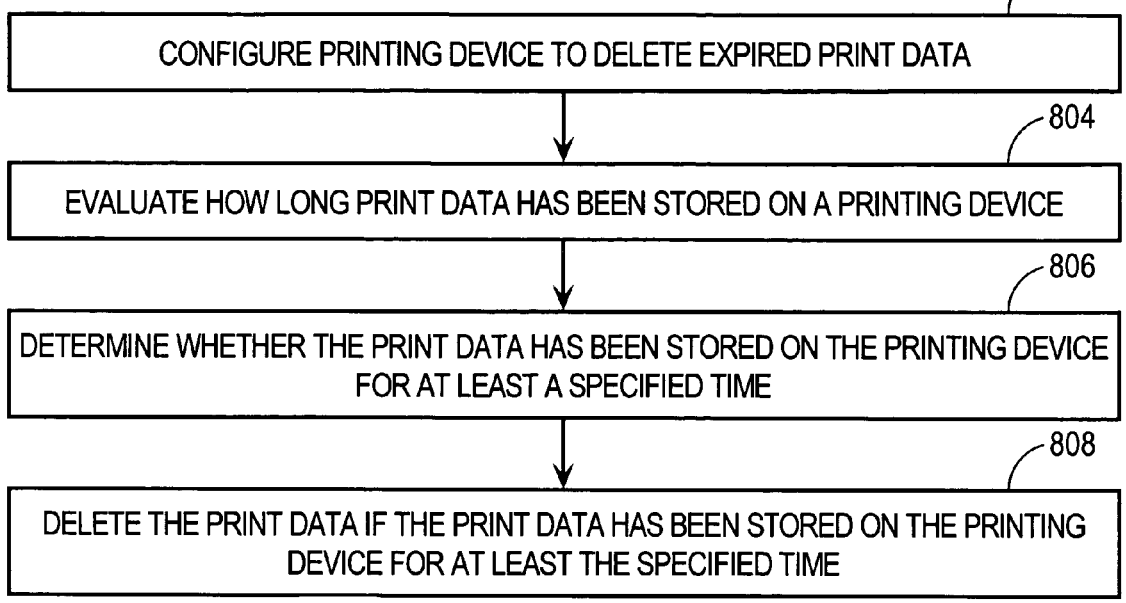
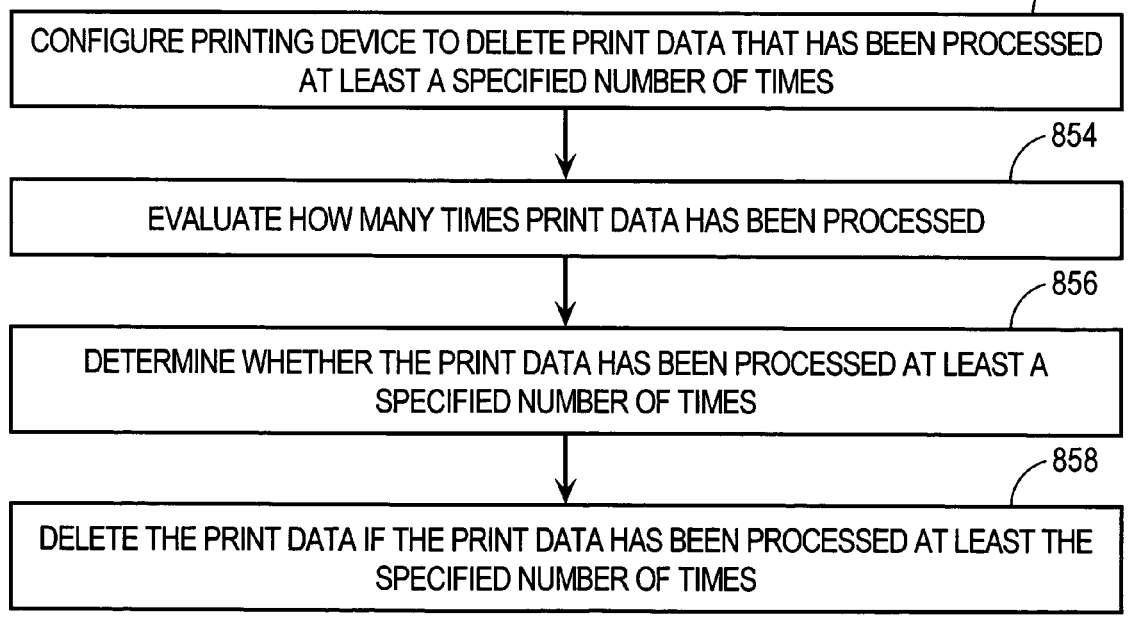

FIG. 9

CONFIGURATION PARAMETERS — 900

| PARAMETER | VALUE |
|---|---|
| EXPIRATION TIME | 1 HR |
| PROCESSING THRESHOLD | 2 |
| REMOTE DELETION | YES |
| LOCAL DELETION | YES |
| INTERNAL ENCRYPTION | YES |
| ENCRYPTION TYPE | TYPE1 |

METHOD AND SYSTEM TO ERASE DATA AFTER EXPIRATION OR OTHER CONDITION

RELATED APPLICATIONS AND CLAIM OF PRIORITY

This application is a continuation-in-part of and claims priority to U.S. patent application Ser. No. 09/947,164, entitled METHOD AND APPARATUS FOR ERASING DATA AFTER TAMPERING, filed on Sep. 4, 2001 now U.S. Pat. No. 6,874,092, which is a continuation of and claims priority to U.S. patent application Ser. No. 09/167,184, now issued as U.S. Pat. No. 6,301,670, entitled METHOD AND APPARATUS FOR ERASING DATA WHEN A PROBLEM IS IDENTIFIED, filed on Oct. 6, 1998, the contents both of which are hereby incorporated by reference in their entirety.

This application is related to U.S. patent application Ser. No. 09/167,628 now issued as U.S. Pat. No. 6,304,948, entitled METHOD AND APPARATUS FOR ERASING DATA AFTER EXPIRATION, filed on Oct. 6, 1998.

This application is related to U.S. patent application Ser. No. 09/167,629 now abandoned, entitled METHOD AND APPARATUS FOR ERASING DATA AFTER TAMPERING, filed on Oct. 6, 1998.

FIELD OF THE INVENTION

The invention relates to data storage systems, and more specifically, to an approach for managing data that provides integrity and security.

BACKGROUND OF THE INVENTION

Most computer systems include some type of non-volatile storage to store and maintain data. Non-volatile storage provides a storage medium whose contents are retained if power is removed. Common examples of non-volatile storage include floppy disks, hard disks and tapes.

Most types of non-volatile storage offer relatively high reliability, particularly when redundant storage is used. The performance of non-volatile storage varies widely between different types of non-volatile storage. For example, hard disks traditionally offer higher performance, in terms of access speeds, than floppy disks or tapes. Most types of non-volatile storage can be re-used, since the process used to store data is non-destructive. When data in the form of a data file is deleted, often directory information associated with the data file is merely updated in the non-volatile storage, and the data file itself is unchanged. For example, on many computer systems, deleting a data file is accomplished by removing the filename from a file directory or file allocation table that makes the locations occupied by the data file available for other data. However, the data file still resides on the non-volatile storage and can be recovered so long as it is not overwritten with other data. This approach makes it difficult to know whether a particular copy of data is an original copy and makes the data susceptible to being obtained by a third party.

Another type of non-volatile storage allows data to be written only once, but read as many times as desired. This type of non-volatile storage is usually referred to as a write once, read many (WORM) storage medium. A common example of a WORM non-volatile storage device is an optical disk. This type of storage medium is useful for archiving data, for example certain types of medical and business records, that are written only once and may be read several times. This guarantees that a particular copy of data is an original copy since the data cannot be updated or overwritten.

Both WORM systems and conventional read/write storage systems suffer from the disadvantage that they are vulnerable to modification of data. A user of data is not sure if the data is original or modified by the unknown sources when using the data. For example, in a disk storage subsystem, an unauthorized individual may remove the disk drive and alter, intercept, or copy the information stored on the disk drive.

In addition, information stored in storage systems can become undesirable to be stored after the passage of sufficient time. Therefore, in some contexts it is desirable to provide a way for old information to expire from a storage system and become unavailable. One such example is a company record that should be destroyed after five years according to the company policy.

Based on the need to securely store and maintain data and the limitations in the prior approaches, an approach for storing and maintaining data that provides a relatively high assurance that a particular copy of data is an original copy is highly desirable.

SUMMARY

According to one aspect of the invention, a method is provided for storing data on a storage unit in a manner that allows modification of the data only if a tamper signal is detected that indicates unauthorized physical access to the storage unit. The method includes detecting the tamper signal and in response to detecting the tamper signal, deleting the data stored on the storage unit by overwriting the data with a specified value, and preventing any data from being written to the storage unit and preventing any data from being read from the storage unit.

According to another aspect of the invention, a data storage unit for storing and maintaining data is provided. The data storage unit comprises a first non-volatile storage device and a processing unit communicatively coupled to the first non-volatile storage device. The processing unit is configured to allow modification of the data stored on the first non-volatile storage device only if a tamper signal is detected that indicates unauthorized physical access to the first non-volatile storage device. The processing unit is also configured to in response to detecting the tamper signal, delete the data stored on the first non-volatile storage device by overwriting the data stored on the first non-volatile storage device with a specified value, and prevent any data from being written to the first non-volatile storage device and prevent any data from being read from the first non-volatile storage device.

According to another aspect of the invention, a method is provided for managing print data on a printing device. Print data is received at the printing device. The print data is stored on a storage device at the printing device. A determination is made whether the print data has been stored on the storage device for at least a specified amount of time. If the print data has been stored on the storage device for at least the specified amount of time, then the print data is deleted from the storage device.

According to another aspect of the invention, a method is provided for managing print data on a printing device. Print data is received at the printing device. The print data is stored on a storage device at the printing device. A determination is made whether the print data has been processed at the printing device at least a specified number of times. If the print data has been processed at the printing device at least the specified number of times, then the print data is deleted from the storage device.

BRIEF DESCRIPTION OF THE DRAWINGS

Embodiments are illustrated by way of example, and not by way of limitation, in the figures of the accompanying drawings in which like reference numerals refer to similar elements and in which:

FIG. 6 is a block diagram that depicts an arrangement for managing print data on printing devices using the techniques described herein;

FIG. 8A is a flow diagram that depicts an approach for deleting print data from a printing device after the print data has resided on the printing device for at least a specified time, according to one embodiment of the invention;

FIG. 8B is a flow diagram that depicts an approach for deleting print data from a printing device after the print data has been processed at least a specified number of times;

FIG. 9 is a block diagram that depicts an example set of configuration parameters used with the techniques for managing print data described herein.

DETAILED DESCRIPTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention. Embodiments of the invention are described hereinafter in the following sections:

I. OVERVIEW
II. SYSTEM OVERVIEW
III. STORAGE UNITS
IV. THE PROCESSING UNIT
V. NON-VOLATILE STORAGE
VI. ERASE AFTER EXPIRATION
VII. ERASE AFTER NON-VOLATILE STORAGE FAILURE
VIII. TAMPER PROTECTION
IX. STORAGE UNIT REGISTRATION
X. DATA ORIGINALITY
XI. PRINTING DEVICE APPLICATIONS
  A. OVERVIEW
  B. ARCHITECTURE
  C. DELETING PRINT DATA AFTER EXPIRATION
  D. DELETING PRINT DATA AFTER BEING PROCESSED A SPECIFIED NUMBER OF TIMES
  E. TECHNIQUES FOR MAINTAINING SECURE PRINT DATA
  F. TECHNIQUES FOR DELETING PRINT DATA
  G. EXAMPLE CONFIGURATION PARAMETERS
XII. IMPLEMENTATION MECHANISMS

I. Overview

An approach for storing, maintaining and accessing data is provided. In general, in one aspect, data is stored on a storage unit and erased after a predetermined time. In another aspect, the data is erased if unauthorized tampering of the storage unit occurs. In yet another aspect, the data is erased in the event of a failure of non-volatile storage in the storage unit. Another approach involves a hardware storage unit where the data can be stored permanently and can be authenticated. The approach is to create the device that has its own operating system with a secure hardware and software interface. The interface ensures that the modification of the data is not allowed. The present invention can be used on such a device where the authenticity of the data is critical. These aspects are described in more detail hereinafter.

II. System Overview

Figure 1:
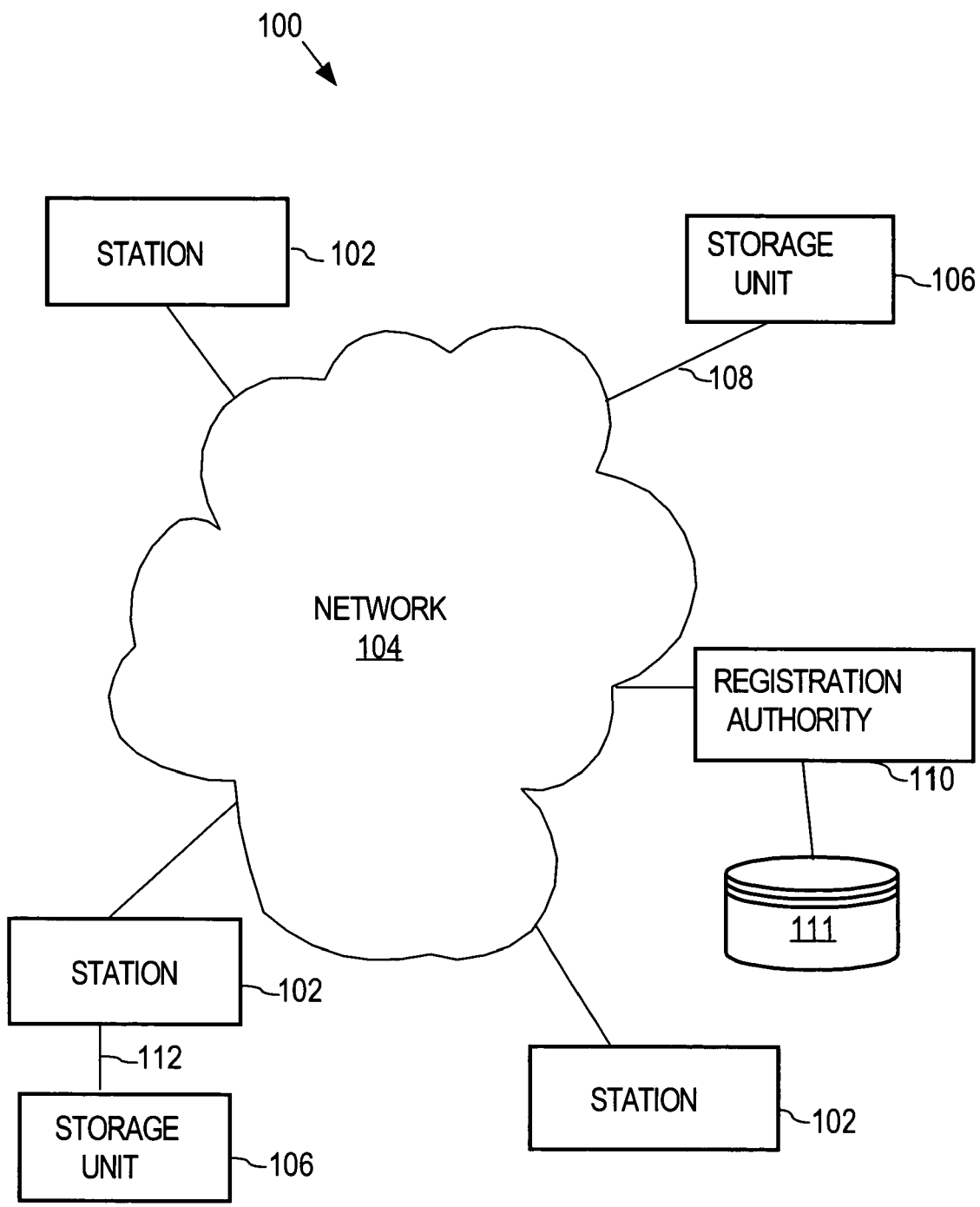
FIG. 1 is a block diagram illustrating a system for storing and maintaining data.

FIG. 1 illustrates a system 100 for storing data. One or more stations 102 are coupled via a network 104. Stations 102 each comprise a computer, a workstation, or other similar processing mechanism. For example, in one embodiment each station 102 is a general purpose computer system of the kind shown in FIG. 6 and described further below. Stations 102 may each represent a client in a client/server environment. Using the network 104, one station 102 may communicate with any other station.

One or more storage units 106 are provided for storing and maintaining data. Storage units 106 may be connected to network 104 via link 108 to operate with other devices such as stations 102 connected to network 104. Link 108 may be any type of communication medium for exchanging data between storage units 106 and other devices. Examples of links 108 include network connections, Ethernet, LAN or WAN connections, or any type of wireless transmission medium. Alternatively, storage units 106 may also be connected directly to a particular station 102 using a local link 112. Storage units 106 may also be used in other configurations, for example, connected directly to a particular number of stations 102 to provide local storage to the particular stations 102. Links 108 also may comprise an interface from a station to a storage device, such as a SCSI interface.

In this arrangement, each station 102 may store or retrieve information in a storage unit 106 over a link 108 by communicating an appropriate message over network 104.

The system 100 also includes a registration authority 110 that is communicatively coupled to network 104 and provides for the registration of storage units 106 as described in more detail hereinafter.

III. Storage Units

Figure 2A:
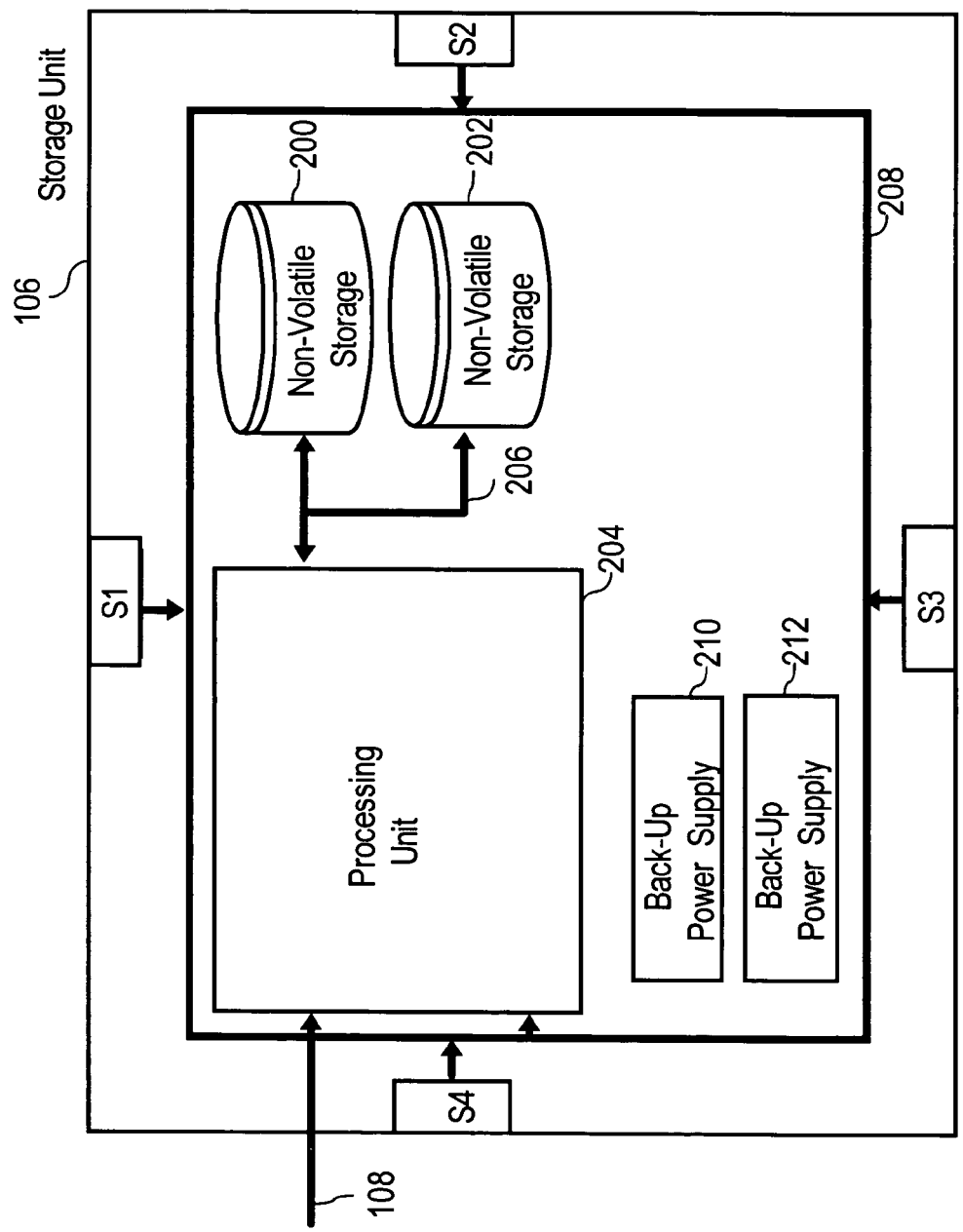
FIG. 2A is a block diagram illustrating a storage unit contained in the system of FIG. 1.
Figure 2B:
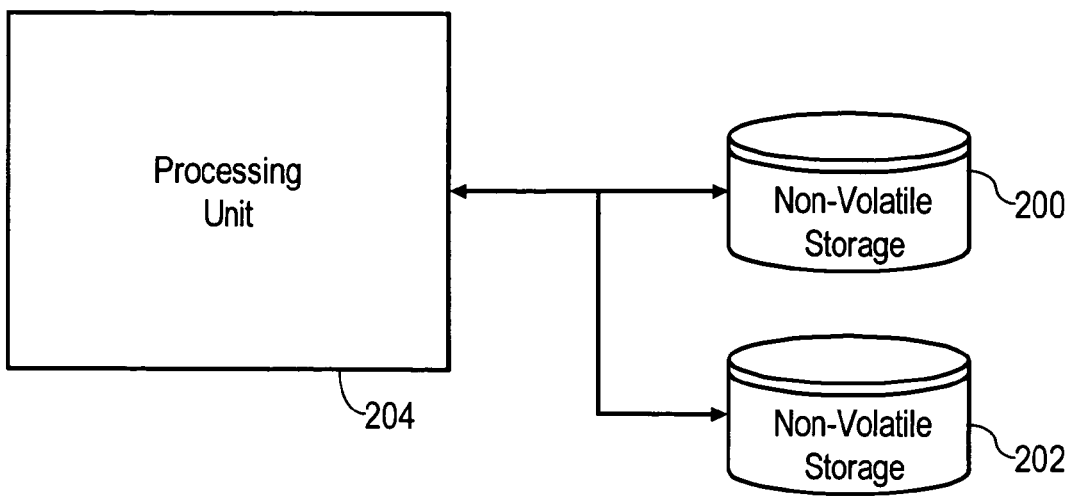
FIG. 2B is a block diagram illustrating a portion of the storage unit of FIG. 2A.
Figure 2C:
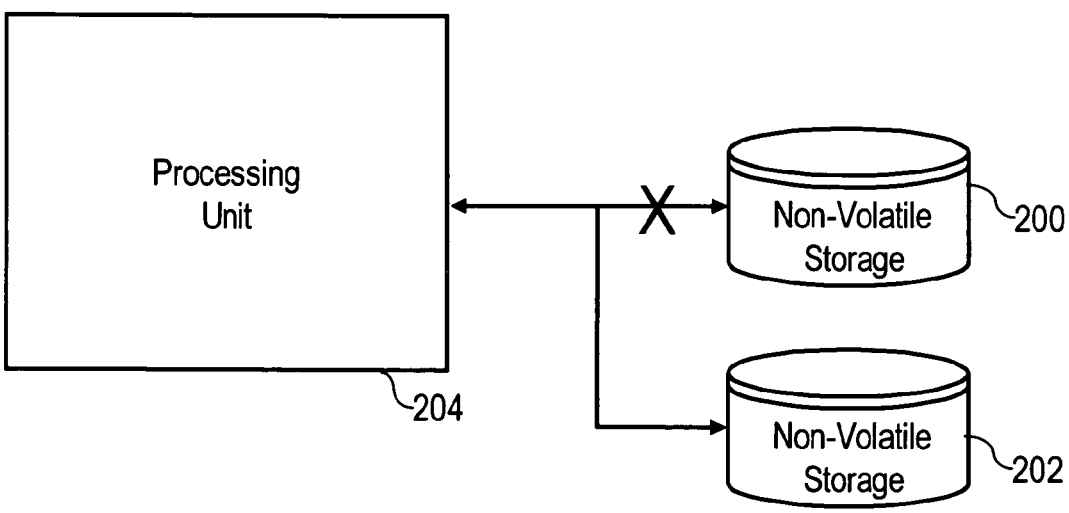
FIG. 2C is a block diagram illustrating a portion of the storage unit of FIG. 2B.

FIG. 2A is a block diagram illustrating a storage unit 106. Storage unit 106 includes one or more non-volatile storage devices 200 and 202. In one embodiment, there are two non-volatile storage devices 200 and 202 that provide redundant storage of data. However, the invention is not limited to a particular number of storage devices 200, 202. As illustrated in FIG. 2B, data is written to both non-volatile storage devices 200 and 202. Thus, as illustrated in FIG. 2C, if one of the non-volatile storage devices 200, 202 is not available, for example due to a failure, the data is written to the other non-volatile storage device 200 or 202. Non-volatile storage devices 200 and 202 may be any type of non-volatile storage, for example, one or more magnetic or optical disks, tapes or other type of non-volatile storage in which stored data is retained if power is removed.

Storage unit 106 includes one or more sensors, identified in FIG. 2 as S1-S4, for sensing unauthorized access to storage unit 106. The sensors S1-S4 are devices that sense an intrusion into the storage unit 106, unauthorized access to the storage unit, or unauthorized tampering with or disabling a storage unit. The sensors S1-S4 are mechanical, electro-mechanical, or electronic devices that generate a signal in response to a sensed event. For example, in an embodiment, each of the sensors S1-S4 is a microswitch that opens or closes when a cover of the storage unit is opened. Each sensor S1-S4 is coupled to a processing unit 204 through a link 208.

Storage unit 106 includes processing unit 204 that controls the flow of data to and from storage unit 106 via link 108, and carries out other processing functions. Processing unit 204 also controls the operation of non-volatile storage devices 200 and 202 including writing data to and reading data from non-volatile storage devices 200 and 202 via a link 206. Processing unit 204 is also communicatively coupled to sensors S1-S4 via a link 208. Links 206 and 208 may be implemented in the same manner as links 108 and provide for the exchange of data between processing unit 204 and non-volatile storage devices 200 and 202 and between processing unit 204 and sensors S1-S4, respectively.

Storage unit 106 also optionally includes backup power supplies 210 and 212 which each provide power to storage unit 106 and its components, including non-volatile storage devices 200 and 202, processing unit 204 and sensors S1-S4. Backup power supplies 210 and 212 are ideally implemented so that either backup power supply 210 or 212 can individually provide sufficient power for storage unit 106 to operate in the event of a power loss. For example, backup power supplies 210 and 212 may be implemented using batteries or an uninterruptible power supply (UPS). Preferably, one of the backup power supplies is an onboard battery that provides backup power to the processing unit 204.

IV. The Processing Unit

Figure 3:
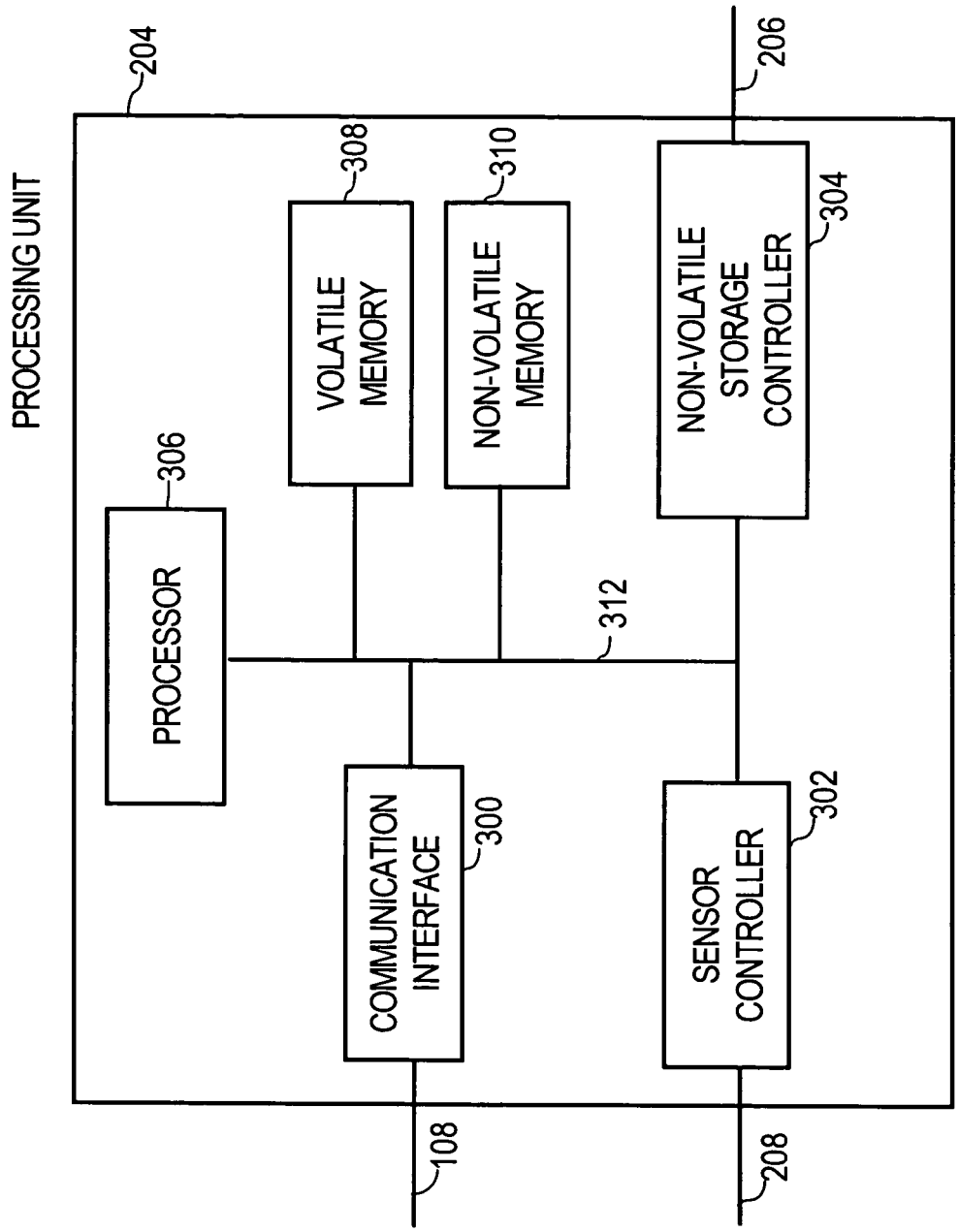
FIG. 3 is a block diagram illustrating a processing unit contained in the storage unit of FIG. 2.

FIG. 3 is a block diagram illustrating a processing unit 204. Processing unit 204 includes a communication interface 300 that controls, buffers and regulates communication between processing unit 204 and other devices external to storage unit 106 via link 108. For example, communication interface 300 may be an I/O controller such as a SCSI, IEEE 1394 or an Ethernet controller. Processing unit 204 includes a sensor controller 302 that interfaces and provides communication between sensors S1-S4 and processing unit 204 via link 208. For example, the sensor controller is an analog I/O interface.

Processing unit 204 also includes a non-volatile storage controller 304 that controls non-volatile storage devices 200 and 202 via link 206. For example, the storage controller 204 is a disk controller. Processing unit 204 also includes a processor 306 that controls the operation of the processing unit 204 and its components described herein. Processor 306 is a microprocessor, for example.

Processing unit 204 includes a volatile memory 308, such as a RAM, that contains data and instructions for processor 306. Processing unit 204 also includes a non-volatile memory 310, such as a ROM, PROM, EPROM, Flash Memory, or other non-volatile memory.

Communication interface 300, sensor controller 302, non-volatile storage controller 304, processor 306, volatile memory 308 and non-volatile memory 310 are communicatively coupled via a link 312 that allows communication between these elements. An example of link 312 is a communication bus or the combination of an address bus and a data bus.

Preferably, the processing unit 204 operates under control of a real-time operating system (OS) such as UNIX. One or more stored programs, operating under control of the OS, manage operation of the storage units and the processes described further herein.

V. Non-Volatile Storage

Figure 4A:
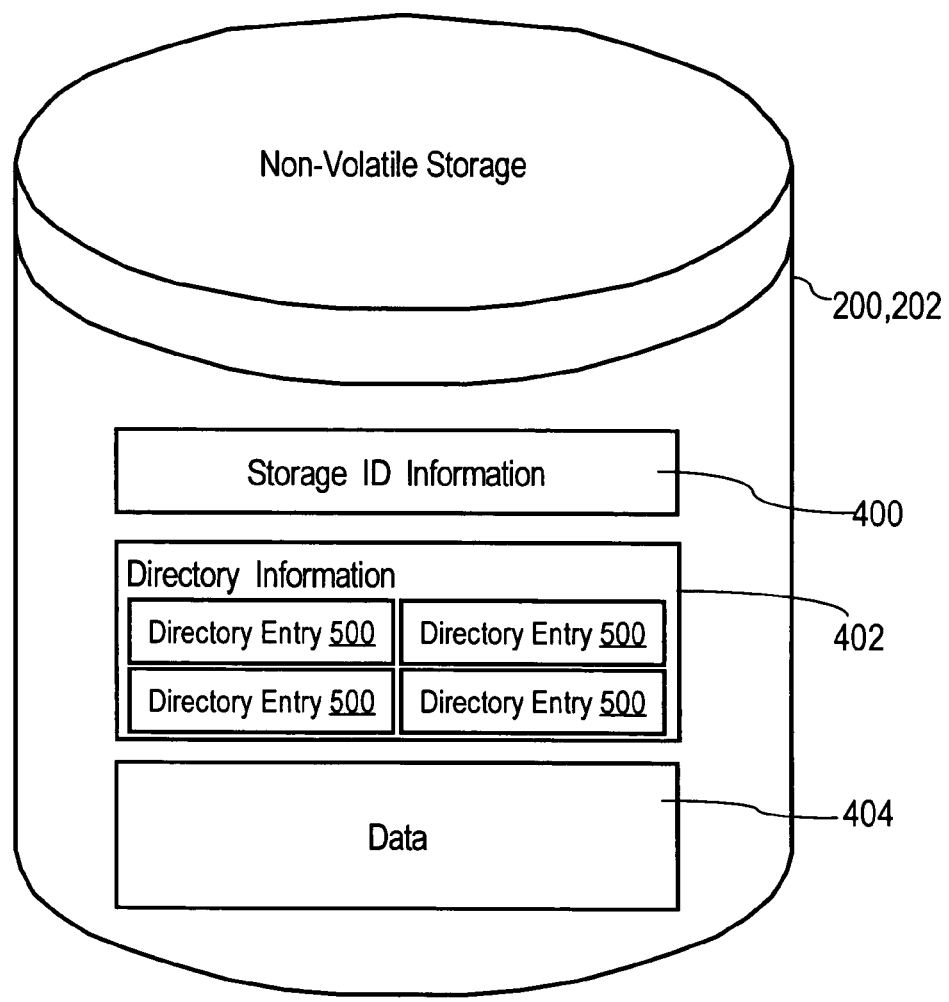
FIG. 4A is a block diagram illustrating the contents of a non-volatile storage device contained in the storage unit of FIG. 2.

FIG. 4A illustrates the contents of non-volatile storage devices 200 and 202. Non-volatile storage devices 200 and 202 each include or store storage ID information 400 that uniquely identifies non-volatile storage devices 200 and 202. For example, storage ID information 400 may include unique serial numbers for non-volatile storage devices 200 and 202. Storage ID information 400 also specifies information obtained during registration of storage unit 106 that is used to authenticate storage unit 106. The registration of storage units is described in more detail hereinafter.

Non-volatile storage devices 200 and 202 also include directory information 402 that specifies information about data 404 contained on non-volatile storage devices 200 and 202. According to one embodiment, data 404 includes a plurality of data files and directory information 402 includes a plurality of directory entries 500 that correspond to and specify information about the data files in data 404. A file-oriented storage system is not required. The data 404 may be stored information of any kind and the directory information 402 may be any metadata that describes the data 404.

Figure 5A:
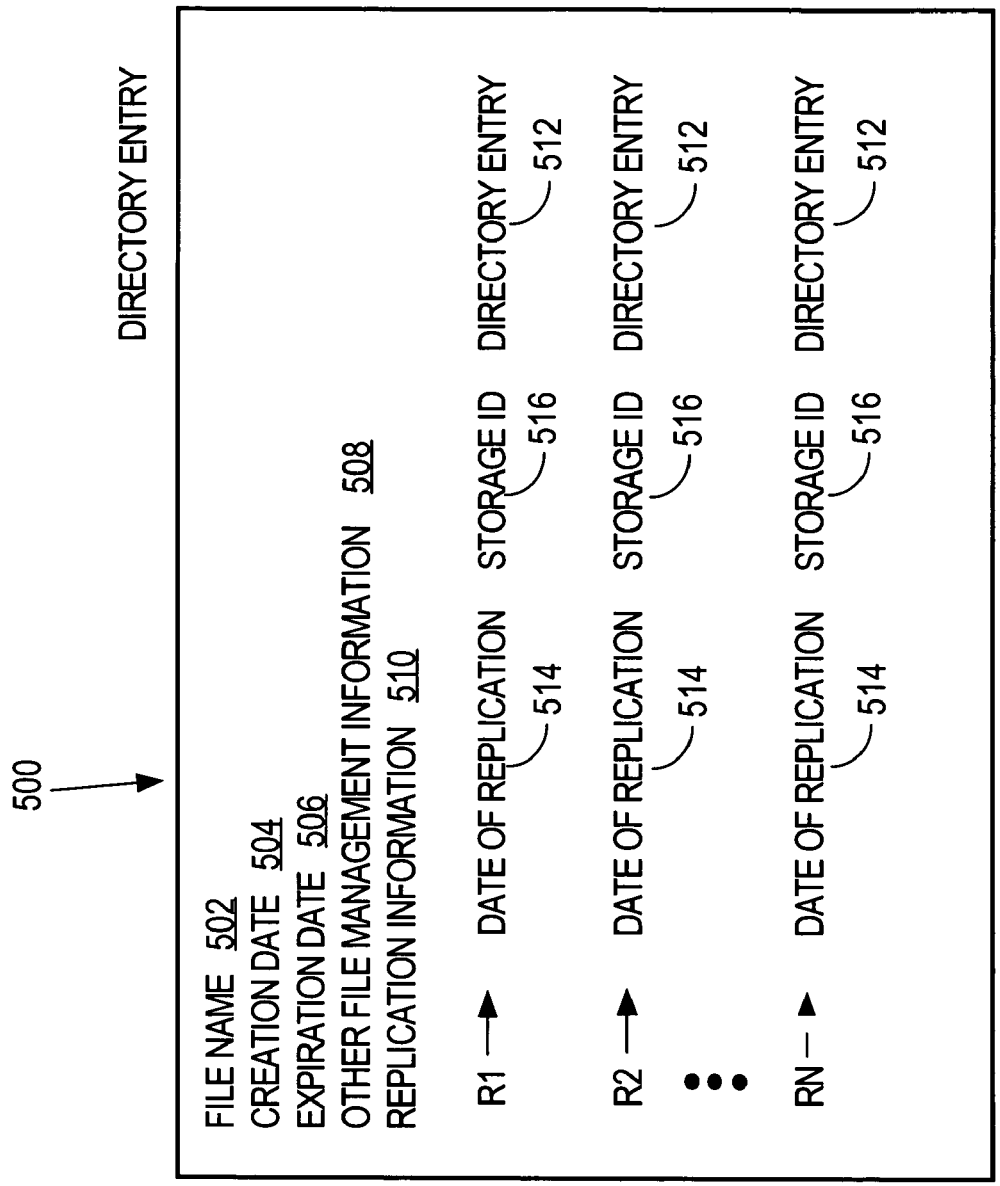
FIG. 5A illustrates the contents a directory entry contained in the non-volatile storage device of FIG. 4A.

FIG. 5A illustrates the contents of a directory entry 500 according to one embodiment. Directory entry 500 specifies the name of the corresponding data file (File Name 502), the creation date of the corresponding data file (Creation Date 504), the expiration date of the corresponding data file (Expiration Date 506) and other file management information 508 that may vary depending upon a particular application. For example, the other file management information is a file type, associated application, etc.

Directory entry 500 also specifies replication information 510 that identifies one or more directory entries 512 (R1, R2 . . . RN) for sources of the data file associated with the file 502. Each file contains the complete history of the parent data with the storage ID information, replication date and directory path on the storage ID. The file name of the data is not changed from the original. The expiration data is also copied.

As used herein, "expiration date" means a time, day or date at which associated data is invalid or unusable. Information in the storage devices is managed by the OS.

VI. Erase after Expiration

According to one embodiment, data stored on non-volatile storage devices 200 and 202 is erased after a specified period of time. This process is data specific, which means that different data may reside on non-volatile storage devices 200 and 202 for different periods of time. Also, different expiration dates may apply to different data. Some data may not be erased at all and may reside on non-volatile storage devices 200 and 202 indefinitely.

Figure 5B:
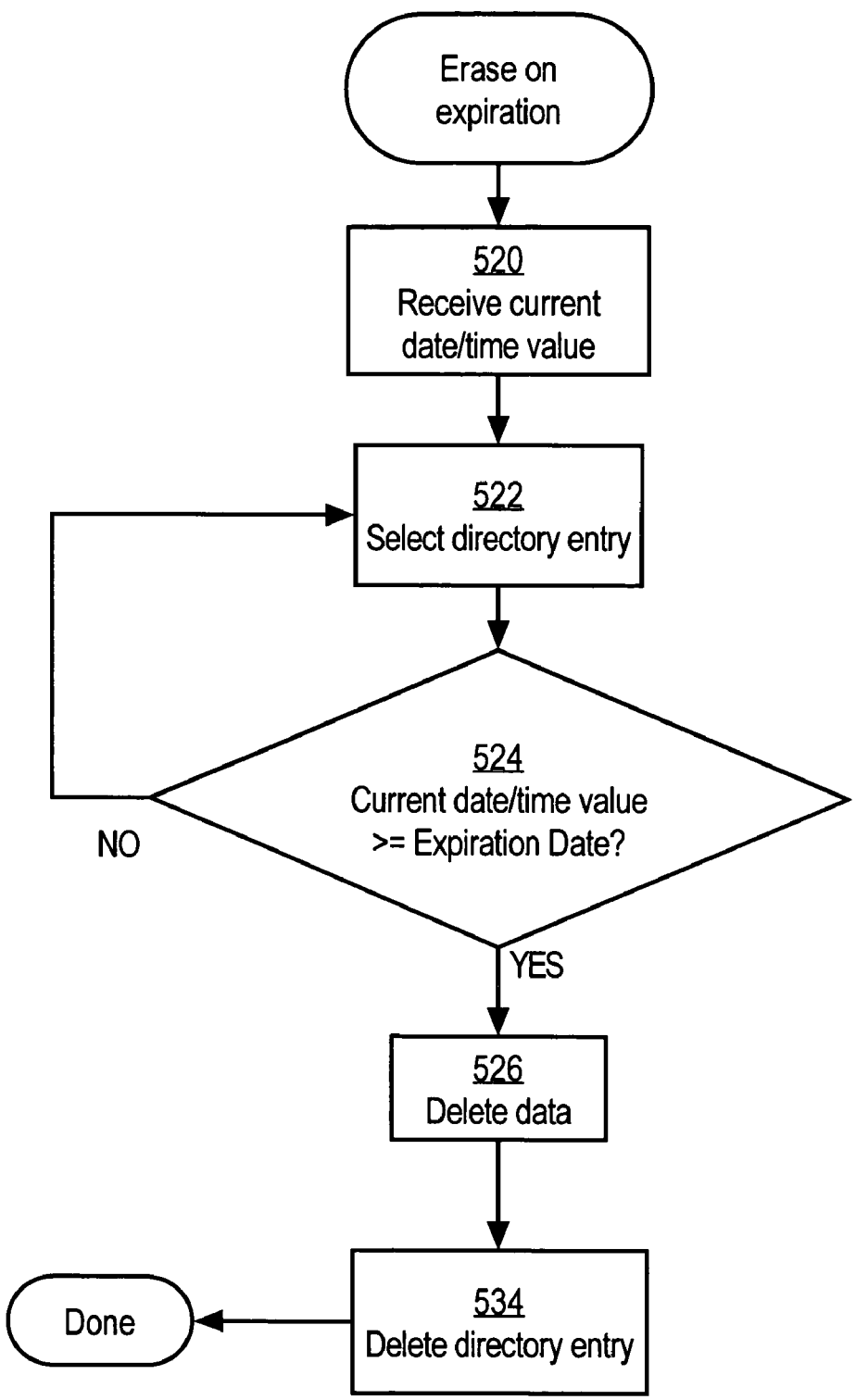
FIG. 5B is a flow diagram of an erase process.

Referring to FIG. 4A, FIG. 5A, and FIG. 5B, directory entries 500 contained in directory information 402 are examined to determine if the Expiration Date 506 has been reached. This is performed by comparing the Expiration Date 506 for a particular directory entry 500 to the current date. Alternatively, instead of maintaining an Expiration Date 506 in each directory entry 500, a "time to keep" may be maintained in each directory entry and the expiration date may be determined from both the creation date and the "time to keep." An alternative approach is to have an agent that visits all the entries of all the directories to check the time and date of the system against expiration date of the entries. If the expiration date is passed, the agent deletes the entries.

FIG. 5B is a flow diagram of a preferred method of erasing data. In block 520, a current date/time value is received. For example, the processing unit 204 requests and receives a date/time value by calling a function of an operating system that controls the operation of the processing unit. Alternatively, the processing unit contains a clock that is directly interrogated by the processor 306. The current date/time value reflects the current day, date, or time of execution of the method shown in FIG. 5B. Preferably, the current date/time value is stored in a temporarily location for later use, such as in a CPU register, a scratchpad memory area, or in main memory.

In block 522, one directory entry 500 is selected for processing. In one embodiment, block 522 involves serial polling of all the directory entries 500 in the storage devices 200, 202. Alternatively, block 522 involves selecting a directory entry based on a heuristic process, such as a least-recently-used (LRU) algorithm, probability, or statistics.

In block 524, a determination is made whether to delete data represented by the current directory entry. In an embodiment, block 524 involves testing whether the current date/time value received in block 520 is greater than or equal to the Expiration Date value 506 stored in the current directory entry. If so, then the current directory entry is to be deleted.

Once a determination is made that particular data is to be deleted, the data associated with the current directory entry is deleted from data 404 as shown by block 526. Otherwise, control passes to block 534. Once the particular data has been deleted, the directory entry 500 is deleted, as shown by block 534. All identical copies of the particular data are also deleted from data 404 since the copies contain the identical expiration date and are also checked.

According to one embodiment, deleting data 404 and the corresponding directory entry 500 from directory information 402 in blocks 526, 530 and 534 is performed by overwriting the data and the directory entry with a predetermined value. An example predetermined value found to be suitable is OOH, although other predetermined values may also be used. Some prior approaches merely delete the directory entry without deleting the data itself, which allows the data to be recovered. Overwriting data with a predetermined value is considered more secure because the overwritten data is more difficult to recover. Once data has been deleted from data 404 and the corresponding directory entry has been deleted from directory information 402, the overwritten areas may be used to store other data.

According to an alternative embodiment, different predetermined values are used to overwrite different data. For example, suppose the Expiration Date for a particular data file residing on non-volatile storage device 200 indicates that the particular data file is to be deleted. A copy of the particular data file is maintained on non-volatile storage device 202. The particular data file on non-volatile storage device 200 may be overwritten with a first predetermined value while the copy of the particular data file on non-volatile storage device 202 is overwritten with a second predetermined value that is different that the first predetermined value. Different predetermined values may also be used to overwrite the corresponding directory entries.

According to one embodiment, the process of FIG. 5B is performed by processing unit 204. Specifically, processor 306 may perform this process by executing one or more instructions maintained in volatile memory 308 and non-volatile memory 310. Alternatively, the process of examining entries in directory information 402 may be performed external to storage unit 106, for example, by another process or station 102 connected to network 104. In this situation, the other process or station 102 may query storage unit 106 via link 108 to obtain directory information 402.

Although storage ID information 400, directory information 402 and data 404 are described and illustrated as being maintained together on non-volatile storage devices 200 and 202, some of this information may be maintained separately in another location. For example, part or all of directory information 402 may be maintained in volatile memory 308 of processing unit 204 reduce the time required to determine if any data files need to be deleted from data 404.

VII. Erase after Non-Volatile Storage Failure

According to another embodiment, in the event of a failure of either of the non-volatile storage devices 200 or 202, all data contained in data 404 and directory entries contained in directory information 402 are deleted as previously described. The other storage device is then designated as the primary storage device and continues to be used. An example situation in which this might occur is where an update is being made to both non-volatile storage devices 200 and 202 and a media failure prevents the update from being made to either non-volatile storage device 200 or 202. Since non-volatile storage devices 200 and 202 provide redundant storage, the data is deleted from the non-volatile storage devices 200 or 202 that failed so that non-volatile storage devices 200 and 202 will not contain different (and presumably valid) data.

Figure 5C:
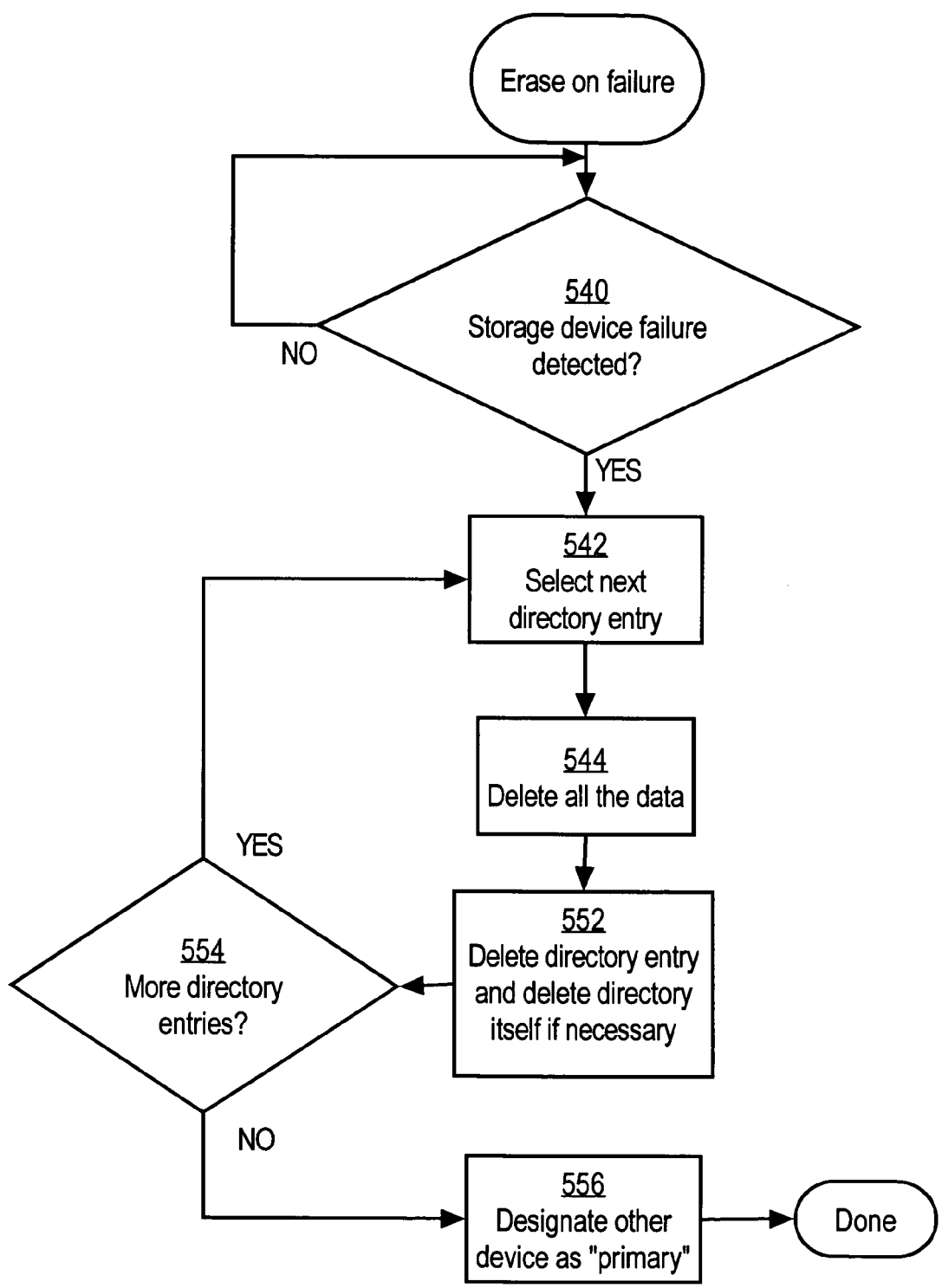
FIG. 5C is a flow diagram of an erase on failure process.

FIG. 5C is a flow diagram of a preferred method of erasing a storage device in the event of a failure. In block 540, a storage device failure is detected. For example, block 540 may involve the steps of detecting, in a power-up routine or bootstrap loader routine, that a power failure or other failure has occurred. In one embodiment, each storage device 200, 202 has a dedicated storage location that stores a marker value. The marker value is a pre-determined value that signifies a graceful shutdown of the storage device. When the storage device is shut down gracefully, the pre-determined marker value is stored in the dedicated storage location. When the storage device is started up, the pre-determined marker value is checked and then overwritten with a different value. Thus, when an unexpected failure occurs, the dedicated storage location does not contain the marker value, and the storage device thereby detects that a failure occurred.

If a failure is detected, then in block 542 the next directory entry among the directory entries 500 is selected. In one embodiment, block 542 involves serial polling of all the directory entries 500 in the storage devices 200, 202. Alternatively, block 542 involves selecting a directory entry based on a heuristic process, such as a least-recently-used (LRU) algorithm, probability, or statistics.

In block 544, all of the data associated with the current directory entry is deleted, for example, by overwriting the data with a pre-determined value. In block 552 the current directory entry is deleted, for example, by overwriting it. If necessary, the directory itself is deleted.

In block 554, a determination is made whether additional directory entries are in the directory information of the storage device. If so, the steps of blocks 542 and 552 are repeated for each additional directory entry.

In optional block 556, the other storage device is designated as the primary storage device of the storage unit. Such designation means that the storage unit continues to operate with read/write operations directed to the non-failing storage device. In this way, the storage unit remains operable, but a failed storage device within the storage unit is rendered unusable.

Once the data on the failed non-volatile storage devices 200 or 202 has been deleted, the device may be re-initialized. Once a determination has been made that the failed device has been successfully re-initialized, the data contained on the non-volatile storage devices 200 or 202 that did not fail can be copied onto the recovered non-volatile storage devices 200 or 202. In the event that the failed non-volatile storage devices 200 or 202 cannot be re-initialized successfully, the data from the non-volatile storage devices 200 or 202 that did not fail may be copied to a non-volatile storage device in another storage unit 106.

The use of redundant non-volatile storage devices 200, 202 provides significantly higher data reliability because it is extremely unlikely that both non-volatile storage devices 200 and 202 will fail at the same time. To provide further data reliability, other storage units 106, each including redundant non-volatile storage devices 200 and 202 may be employed to provide further redundancy.

VII. Tamper Protection

According to an embodiment, storage units 106 are protected against unauthorized tampering. Sensors S1-S4 are monitored by processing unit 204 via link 208 to detect tampering with storage unit 106. The selection and placement of sensors S1-S4 is determined by the requirements of a particular application, but in general, is designed to detect unauthorized access to storage unit 106 through the breaking of seals, opening of sealed compartments, or other forceful entry into storage unit 106.

In the event that sensors S1-S4 detect unauthorized access to storage unit 106, a tamper signal is provided by sensors S1-S4 to processing unit 204. In response to the tamper signal, processing unit 204 deletes storage ID information 400, directory information 402 and data 404 in the manner previously described from non-volatile storage devices 200 and 202. This prevents the unauthorized use of data stored on storage unit 106.

Figure 5D:
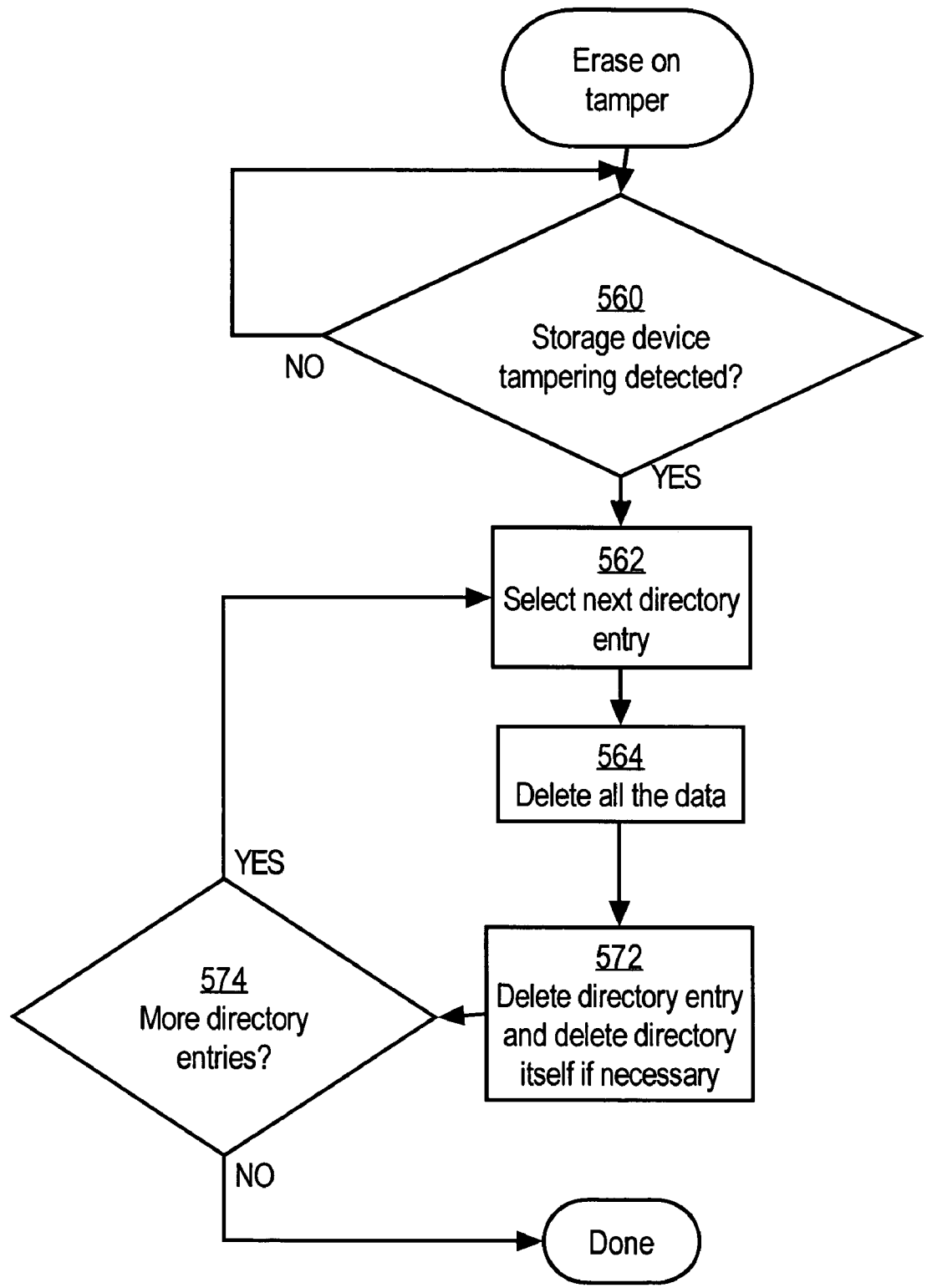
FIG. 5D is a flow diagram of an erase on tamper process.

FIG. 5D is a flow diagram of a preferred method of erasing a storage device in the event of tampering with the storage device. In block 560, a disturbance to a storage device, such as tampering with the storage device, invasion of the storage device, opening the storage device, etc., is detected. For example, block 560 may involve the steps of detecting that one or more of the sensors S1-S4 is activated or is generating a sensing signal.

If a tampering event is detected, then in block 562 the next directory entry among the directory entries 500 is selected. In one embodiment, block 562 involves serial polling of all the directory entries 500 in the storage devices 200, 202. Alternatively, block 562 involves selecting a directory entry based on a heuristic process, such as a least-recently-used (LRU) algorithm, probability, or statistics.

In block 564, all the data associated with the current directory entry is deleted, for example, by overwriting the data with a pre-determined value. In block 572 the current directory entry is deleted, for example, by overwriting it. If necessary, the directory itself is deleted.

In block 574, a determination is made whether additional directory entries are in the directory information of the storage device. If so, the steps of blocks 562 to 572 are repeated for each additional directory entry.

In one embodiment, block 562 or other blocks also involve the step of generating an alert to an authorized person to signify that tampering has occurred and the erase operations have been carried out. For example, in block 562 the processing unit 204 generates a message to a pre-determined station 102 that informs the station that tampering is detected and erasure is underway.

According to another embodiment, in the event of a power failure, backup power supplies 210 and 212 provide power for storage unit 106 including sensors S1-S4. However, non-volatile storage devices 200 and 202 operate in a power save mode. When operating in power save mode, normal write and read operations to non-volatile storage devices 200 and 202 are prohibited to conserve power. Once power has been restored, write and read operations to non-volatile storage devices 200 and 202 are continued. However, while storage unit 106 is operating in power save mode, if sensors S1-S4 detect unauthorized access to storage unit 106, all available power is used to delete storage ID information 400, directory information 402 and data 404 from non-volatile storage devices 200 and 202 as previously described. In this way, the erasure process cannot be circumvented merely by disconnecting power from a storage unit.

IX. Storage Unit Registration

According to an embodiment, storage units 106 are registered with registration authority 110 to provide authentication of storage units 106. According to this approach, each storage unit 106 is registered with registration authority 110 by providing a unique storage unit identifier value to registration authority 110. In response, a registered identifier value is provided by registration authority 110 and stored in storage ID information 400 on non-volatile storage devices 200 and 202. Once a storage unit 106 is registered in this manner, a station 102 may verify that a particular storage unit 106 is registered with registration authority 110 by requesting the registered ID number from the particular storage unit 106 and then verifying with registration authority 110 that the registered Storage ID number is valid. This ensures that data contained on a particular storage unit 106 is original and authentic.

Figures 4B, 4C:
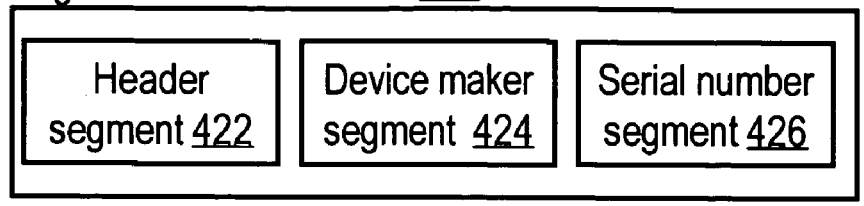
FIG. 4B is a diagram of a registered identifier value.
FIG. 4C is a diagram of a table of a registration authority database.

FIG. 4B is a diagram of a preferred embodiment of the registered identifier value 420 that comprises a header segment 422, a device maker segment 424, and a serial number segment 426.

The header segment 422 identifies the registration authority 110. For example, the header segment contains a predetermined value that is uniquely associated, within the context of the storage unit or the OS, with the registration authority 110. The device maker segment 424 uniquely identifies the manufacturer or brand name of a storage unit. The device maker segment 424 may be a manufacturer name or a code number that uniquely identifies a particular manufacturer. The serial number segment 426 contains the serial number of the storage unit.

FIG. 4C is a diagram of the database 111. Preferably, the database 111 comprises at least one table 460 having one or more rows 462. Each row 462 corresponds to a storage unit 106. The table 460 has columns 464-468 that store manufacturer or brand name values, serial number values, and assignment date values. Each assignment date value identifies the date on which a row representing a storage device was added to the table 460.

X. Data Originality

In some circumstances, it may be desirable to preserve the originality and uniqueness of certain data stored on storage units 106 by not changing or deleting the certain data. In this way, the storage unit can "guarantee" to an external process or device that certain data is unaltered since it was originally written.

According to one embodiment, an audit trail is generated when data is copied from one device to another. As illustrated in FIG. 5A, each replication entry (R1, R2 . . . RN) specifies a date of replication 514 and source information including a storage ID 516 and a directory entry 512. In order to replicate data from a source device to a destination device, a replicate command is issued to the destination device with the specification of the source device along with the file information. The destination device then issues a special read command to the source device so that the data is encrypted to avoid modification of the data when transferred from the source device to the destination device.

Therefore, according to one embodiment, an approach is provided for ensuring that certain data stored on storage unit 106 is written only once and never changed, although the certain data may be read an unlimited number of times (read-only). The approach is data specific and does not require that all stored data be maintained as read-only data.

According to one embodiment, after read-only data is stored on non-volatile storage 200 and 202, the directory entry 500 associated with the read-only data is updated to reflect that the associated data is read-only data and is never to be overwritten or changed. The update acts as a declaration to other devices or processes that the stored data is unique and unchanged. For example, after read-only data has been written to non-volatile storage 200 and 202, other file management information 508 in the directory entry 500 associated with the read-only data is updated to reflect that the associated data is read only and is not to be changed. Thereafter when data is to be changed from non-volatile storage 200 and 202, the directory entry 500 associated with the data is examined to determine whether the particular data is read-only. If not, the associated data is changed as described herein. If so, then the associated data and directory entry 500 are not changed.

Another method of ensuring the originality is to limit write commands that can be executed on a particular device. For example, for situations where the files stored in a device are to be kept as authenticated data files to ensure the originality, the device may require a special status to write. Without the special write status, a write command fails when the same file name exists on a device.

This approach is applicable to any of the approaches described herein, include the erase after expiration, erase after tamper and erase after failure approaches discussed herein. This approach provides a way to immunize or guarantee the validity of stored data, so that the stored data is more reliable, for example, as legal evidence. The contents and uniqueness of the data are assured or guaranteed.

XI. Printing Device Applications

A. Overview

Managing and controlling access to sensitive information has become an important issue for individuals, business organizations and governments. Many business organizations and governments have implemented policies and procedures for controlling the dissemination of and access to information. For example, policies and procedures may specify that data transmitted over a network must be encrypted using a specified protocol or that a virtual private network (VPN) must be used to remotely access a server that stores sensitive information. As another example, policies and procedures may specify that certain sensitive data may only be stored in certain locations, e.g., on secure servers, and/or in a particular manner, e.g., in an encrypted format.

In view of the foregoing, the techniques described herein for managing data may be used to manage print data residing on printing devices. According to various embodiments of the invention, print data is deleted from print devices after expiration or after the print data has been processed a specified number of times. In addition, if a printing device needs to be operated in a secure environment, the tamper proofing approach described herein in Section VIII may be used with the printing device system. As used herein, the term "print data" refers to electronic data that may be represented in printed form when processed, as well as other data, such as commands and parameters, that may be processed to cause the electronic data to be printed.

B. Architecture

FIG. 6 is a block diagram that depicts an arrangement 600 for managing print data on printing devices using the techniques described herein. Arrangement 600 includes printing devices 602, 604 and a multi-function peripheral (MFP) 606 communicatively coupled to a network 608. Printing devices 602, 604 and MFP 606 are configured to process print data and generate output, typically in the form of a hard copy of the print data. Printing devices 602, 604 may be any type of printing devices that have at least printing capabilities, and may have one or more other capabilities. Examples of printing devices 602, 604 include, without limitation, printers, such as dot matrix, inkjet and laserjet printers, facsimile machines and copiers. Network 608 may be any medium or mechanism for allowing data to be exchanged between network elements. Examples of network 608 include, without limitation, a network such as a Local Area Network (LAN), Wide Area Network (WAN), Ethernet or the Internet, or one or more terrestrial, satellite or wireless links.

Figure 7:
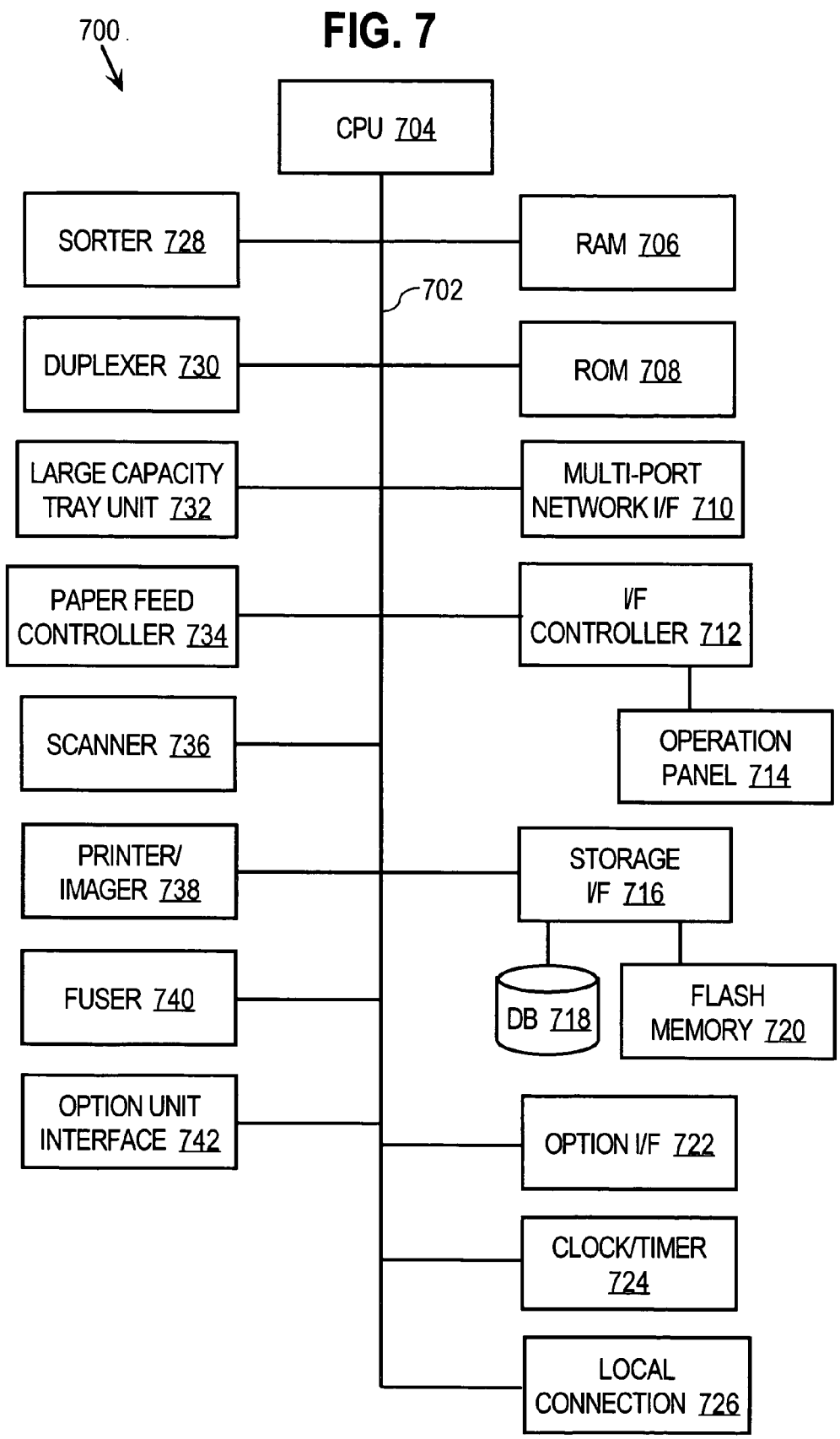
FIG. 7 is a block diagram that depicts an example implementation of a multi-function peripheral (MFP) according to an embodiment of the invention.

MFP 606 is a network device that includes one or more functions, such as printing, copying, facsimile and scanning. FIG. 7 is a block diagram that depicts an example implementation 700 of MFP 606. Implementation 700 includes several computer architecture components communicatively coupled via a communication bus 702, namely, a central processing unit (CPU) 704, a random access memory (RAM) 706, a read-only memory (ROM) 708, a multi-port network interface (I/F) 710, an I/F controller 712 with an attached operation panel 714, a storage I/F 716 with an attached database (DB) 718 and flash memory 720, an option I/F 722, a clock/timer 724 and a local connection 726. Implementation 700 also includes several physical components, such as a sorter 728, a duplexer 730, a large capacity tray unit 732, a paper fee controller 734, a scanner 736, a printer/imager 738, a fuser 740 and an option unit interface 742. The elements for MFP 606 depicted in FIG. 7 are provided as example elements and MFP 606 may contain additional elements or fewer elements, depending upon the requirements of a particular implementation.

Arrangement 600 also includes several example devices configured to generate and provide print data to printers 602, 604 and MFP 606. These include a desktop computer 610, a mobile computer 612, a personal digital assistant (PDA) 614, a cell phone 616 and a work station 618. All of the devices depicted in FIG. 6 may be communicatively coupled to network 608 via one or more wired connections or via one or more wireless connections. All of the devices depicted in FIG. 6 are provided as examples and embodiments of the invention are applicable to any device that is capable of generating print data.

C. Deleting Print Data after Expiration

FIG. 8A is a flow diagram 800 that depicts an approach for deleting print data from a printing device after the print data has resided on the printing device for at least a specified time, according to one embodiment of the invention. For purposes of explanation, the approach is described in the context of deleting expired print data from printer 602, although the approach is applicable to any type of printing device. In step 802, printer 602 is configured to delete expired print data. For example, printer 602 may be configured with a new process to delete expired print data as described herein. Alternatively, existing functions within printer 602 may be modified or augmented with additional functionality to delete expired print data as described herein.

In step 804, the amount of time that print data has been stored on printer 602 is evaluated. The print data may be already stored on printer 602, or may have been just received by printer 602. In step 806, a determination is made whether the print data has been stored on printer 602 for a specified time. For example, the amount of time that the print data has been stored on printer 602 may be compared to a specified time. The specified time may be indicated by data stored locally on printer 602. For example, the specified time may be established by administrative personnel during configuration of printer 602. As another example, configuration data that contains the specified time may be generated and provided to printer 602. As yet another example, the specified time may be indicated by data included in or attached to print data provided to printer 602. For example, a print job received by printer 602 may include both print data and data that indicates the specified time. Alternatively, the specified time may be obtained from another location external to printer 602. For example, a function on printer 602 may retrieve data that indicates the specified time over network 604 from a remote database.

In step 808, if the print data has been stored on the printing device for at least the specified time, then the print data is deleted from printer 602. In this situation, the print data is deleted from printer 602 regardless of whether the print data has been processed, i.e., printed, by printer 602. In some implementations, print data may be automatically deleted after being successfully processed. In other implementations, print data may not be automatically deleted after being successfully processed. In these situations, the print data is deleted from printer 602 after time expiration as described herein. The deleting of print data after expiration may be implemented in conjunction with manual deletion of print data, e.g., by administrative personnel locally or over network 604.

The approach described herein for deleting print data after expiration may be implemented on a per-device basis or on a per-print data basis, depending upon the requirements of a particular implementation. For example, printer 602 may be configured to use a single specified time for all print data on printer 602. Alternatively, a separate specified time may be used for each set of print data on printer 602. For example, a first specified time may be used to evaluate whether first print data should be deleted from printer 602, while a second specified time may be used to evaluate whether second print data should be deleted from printer 602. The first and second specified times may be established by a user through a printer driver or a configuration interface.

D. Deleting Print Data after being Processed a Specified Number of Times

FIG. 8B is a flow diagram 850 that depicts an approach for deleting print data from a printing device after the print data has been processed at least a specified number of times. This may be useful, for example, in situations where an electronic document is distributed to multiple people who need to print the electronic document at a secure printing device. In this situation, a person may have to be at the printer with a specific security password or perform another security measure to retrieve and to print the specified print data within the specified time. For purposes of explanation, the approach is described in the context of deleting print data from printer 602, although the approach is applicable to any type of printing device. In step 852, printer 602 is configured to delete print data that has been processed at least a specified number of times. For example, printer 602 may be configured with a new process to delete print data that has been processed at least a specified number of times. Alternatively, existing functions within printer 602 may be modified or augmented with additional functionality to delete print data that has been processed at least a specified number of times.

In step 854, the number of times that print data has been processed is evaluated. Note that each processing of print data may involve multiple actions occurring and each action is not necessarily considered to be a separate processing of the print data. For example, print data may specify that N number of copies of an electronic document be printed. In this situation, each processing of the print data and the corresponding printing of the N number of copies of the electronic document is considered to be a single processing of the print data.

In step 856, a determination is made whether the print data has been processed at least a specified number of times. For example, the number of times that the print data has been processed may be compared to a threshold. The threshold may be stored locally on printer 602 and established by administrative personnel during configuration of printer 602. As another example, configuration data that indicates the threshold may be generated and provided to printer 602. As yet another example, the specified time may be indicated by data included in or attached to print data provided to printer 602. For example, a print job received by printer 602 may include both print data and data that indicates the threshold. Alternatively, the threshold may be obtained from another location external to printer 602. For example, a function on printer 602 may retrieve the threshold over network 604 from a remote database.

In step 858, if the print data has been processed at least the specified number of times, then the print data is deleted from printer 602. As with the expiration approach described herein, the print data is deleted from printer 602 regardless of where the print data is stored on printer 602.

The approach described herein for deleting print data that has been processed at least a specified number of times may be implemented on a per-device basis or on a per-print data basis, depending upon the requirements of a particular implementation. For example, printer 602 may be configured to use a single threshold to evaluate all print data on printer 602. Alternatively, a separate threshold may be used to evaluate each set of print data on printer 602. For example, a first threshold may be used to evaluate whether first print data should be deleted from printer 602, while a second threshold is used to evaluate whether second print data should be deleted from printer 602.

E. Techniques for Maintaining Secure Print Data

Some implementations may involve sensitive data where it is desirable to maintain print data in a secure manner on print devices. According to one embodiment of the invention, print data is encrypted when stored on printer 602. For example, printer 602 may be configured to encrypt received print data and then store the encrypted print data on printer 602. When the encrypted print data is to be processed, the encrypted print data is retrieved from storage, decrypted to recover the original print data and the original print data is then processed normally. If an unauthorized party accesses a printing device and obtains a copy of encrypted print data, then the characteristic of the print data being encrypted will make it impossible, or at least difficult, for the third party to decrypt the encrypted print data and recover the original print data. The particular manner in which print data is encrypted on printer 602, e.g., the type of encryption used, may be specified by configuration data for printer 602. The configuration data for printer 602 may be specified by administrative personnel, e.g., though a GUI, or provided to printer 602 over network 608.

Alternatively, data may be included with, or attached to, print data that specifies the particular manner in which the print data is to be encrypted on printer 602. For example, particular print data received by printer 602 may include a header portion and a payload portion. The header portion specifies that a particular encryption algorithm is to be used to encrypt the particular print data. The payload portion includes the print data to be processed and ultimately printed at printer 602. Thus, the encrypting of print data on printer 602 may be performed on a per-device basis or on a per-print data basis.

The encryption of print data on printer 602 may be separate from, or in addition to, any encryption provided during transmission of the print data to printer 602. For example, mobile computer 612 may generate print data and then encrypt the print data using a particular encryption technique prior to transmitting the print data to printer 602 over network 608. Printer 602 receives and decrypts the encrypted print data to recover the original print data. The original print data may then be encrypted and stored on printer 602.

F. Techniques for Deleting Print Data

For implementations involving sensitive data it may be desirable to ensure that print data has been completely deleted from a printing device and to reduce the likelihood that deleted print data can be recovered using forensic data investigation and recovery techniques. Therefore, according to one embodiment of the invention, deleting print data from a printing device includes deleting one or more copies of print data from the printing device, regardless of where the print data may be stored on the printing device. For example, one or more copies of print data may be deleted from volatile storage in printer 602, such as random access memory (RAM), as well as non-volatile storage in printer 602, such as one or more disks. Multiple copies of print data may be deleted from printer 602. In addition, deleting the print data from printer 602 may include using techniques designed to reduce the effectiveness of forensic techniques to recover the deleted data. For example, deleting the print data may include overwriting the print data with a specified value, e.g., 00H to FFH, ten or more times, in addition to deleting an entry from an operating system directory, e.g., a file attribute table (FAT).

In addition to the techniques described herein, print data may be deleted from a printing device locally, for example, by administrative personnel via a GUI or operations panel. A password may be required to delete print data locally in this manner. Print data may also be deleted remotely, for example from a client application. In this situation, an identifier may be associated with each set of print data so that print data may be selectively deleted from a printing device that may have many sets of print data. The identifier may be created by the application that provides the print data to a printing device. For example, suppose that PDA 614 generates print data that specifies that a particular electronic document is to be printed. PDA 614 also generates an identifier that is associated with the print data. PDA 614 sends both the print data and the identifier to printer 604 for processing. PDA 614 may then send a command and the identifier to printer 604 to delete the print data associated with the identifier. For example, a user of PDA 614 may interact with PDA 614 through a GUI and request that an electronic document be printed on printer 604. The same user may later realize that the electronic document should not be printed and initiates a cancellation process, for example, by selecting a cancel option on a GUI. PDA 614 sends a cancel command with the identifier associated with the electronic document to printer 604. Printer 604 then deletes the print data corresponding to the identifier received from PDA 614.

G. Example Configuration Parameters

FIG. 9 is a block diagram that depicts an example set of configuration parameters 900 used with the techniques for managing print data described herein, according to one embodiment of the invention. Configuration parameters 900 may be configured at a printing device, either locally or remotely and applied to all print data for that printing device. Configuration parameters 900 may also represent a set of default values that may be selectively overridden at the printing device, for example by administrative personnel. Alternatively, one or more of configuration parameters 900 may be provided with print data received at a printing device, e.g., in a header of a print job.

In the example depicted in FIG. 9, configuration parameters 900 include an expiration time with a value of one hour and a processing threshold of two. Thus, print data that has been on a printing device for at least one hour will be deleted from the printing device, as previously described herein. Also, print data that has been processed two or more times will be deleted from the printing device.

Configuration parameters 900 also include remote and local deletion parameters, both having values of "YES", indicating that both remote and local deletion of print data is permitted, as previously described herein. Configuration parameters 900 also include internal encryption and encryption type parameters. The internal encryption parameter indicates whether print data should be encrypted at printing devices. In the present example, the internal encryption parameter value is "YES", indicating that print data should be encrypted at a printing device. The encryption type parameter indicates what type of encryption should be used to encrypt print data at a printing device. In the present example, the encryption type parameter value indicates that TYPE1 encryption should be used to encrypt print data at a printing device. The configuration parameters depicted in FIG. 9 are provided as example parameters and different parameters may be used, depending upon the requirements of a particular implementation.

XII. Implementation Mechanisms

Figure 10:
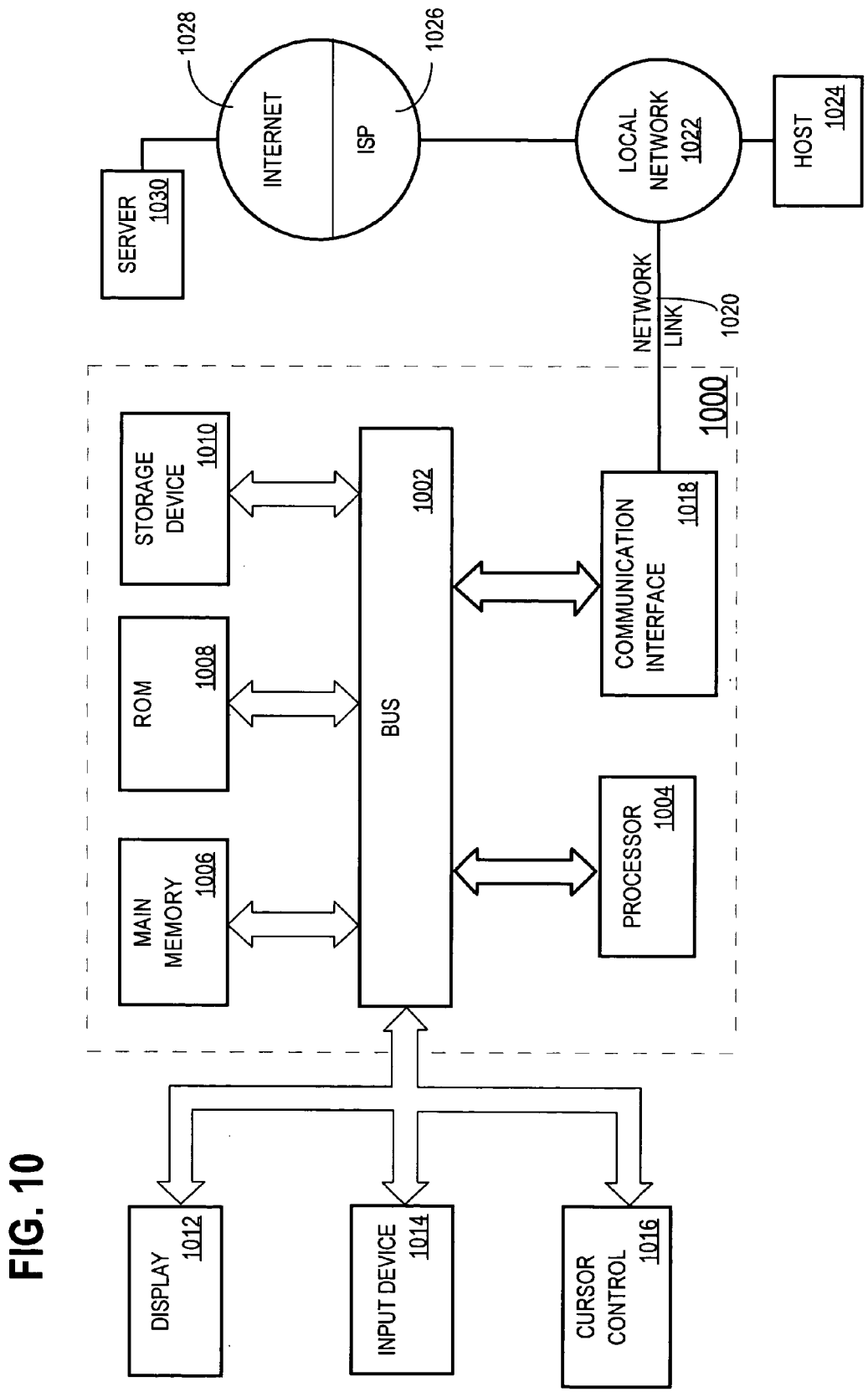
FIG. 10 is a block diagram of a computer system on which embodiments may be implemented.

Embodiments of the invention may be implemented on any type of computing or printing architecture, depending upon the requirements of a particular implementation. For example, embodiments of the invention may be implemented on the example MFP configuration depicted in FIG. 7. As another example, embodiments of the invention may be implemented on conventional computing platforms. FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing print data on a printing device, the method comprising the steps of:
   receiving print data at the printing device;
   causing the print data to be stored on a storage device at the printing device;
   the printing device retrieving, from the print data, data that indicates a specified amount of time that the print data is to be stored on the storage device at the printing device;
   the printing device determining whether the print data has been stored on the storage device at the printing device for at least the specified amount of time; and
   if the print data has been stored on the storage device at the printing device for at least the specified amount of time, then causing the print data to be deleted from the storage device at the printing device.

2. The method as recited in claim 1, wherein the print data has not yet been processed at the printing device at the time the print data has been stored on the storage device for at least the specified amount of time.

3. The method as recited in claim 1, further comprising examining configuration data for the printing device that indicates the specified amount of time.

4. The method as recited in claim 1, wherein determining whether the print data has been stored on the storage device for at least the specified amount of time includes comparing an expiration value associated with the print data to a current date/time value.

5. The method as recited in claim 1, wherein the printing device is a multi-function peripheral.

6. The method as recited in claim 1, further including examining a file directory entry associated with the data to determine the expiration value for the data.

7. The method as recited in claim 1, wherein causing the print data to be deleted from the storage device includes overwriting the print data on the storage device with a specified value.

8. The method as recited in claim 1, further comprising:
   encrypting the print data to generate encrypted print data; and
   storing the encrypted print data on the storage device.

9. The method as recited in claim 1, further comprising:
   receiving an identifier uniquely associated with the print data;
   receiving a delete command and the identifier; and
   in response to receiving the delete command, deleting the print data based upon the identifier.

10. A machine-readable medium for managing print data on a printing device, the machine-readable medium carrying instructions which, when executed by one or more processors, causes the performance of the steps of:
    receiving print data at the printing device;
    causing the print data to be stored on a storage device at the printing device;
    the printing device retrieving, from the print data, data that indicates a specified amount of time that the print data is to be stored on the storage device at the printing device;
    the printing device determining whether the print data has been stored on the storage device at the printing device for at least the specified amount of time; and
    if the print data has been stored on the storage device at the printing device for at least the specified amount of time, then causing the print data to be deleted from the storage device at the printing device.

11. The computer-readable medium as recited in claim 10, further comprising one or more additional instructions which, when executed by the one or more processors, causes the performance of examining data contained in the print data that indicates the specified amount of time.

12. The computer-readable medium as recited in claim 10, further comprising one or more additional instructions which, when executed by the one or more processors, causes the performance of receiving and storing configuration data for the printing device that indicates the specified amount of time.

13. The computer-readable medium as recited in claim 10, wherein determining whether the print data has been stored on the storage device for at least the specified amount of time includes comparing an expiration value associated with the print data to a current date/time value.

14. The computer-readable medium as recited in claim 10, wherein the printing device is a multi-function peripheral.

15. The computer-readable medium as recited in claim 10, further comprising one or more additional instructions which, when executed by the one or more processors, causes the performance of examining a file directory entry associated with the data to determine the expiration value for the data.

16. The computer-readable medium as recited in claim 10, wherein causing the print data to be deleted from the storage device includes overwriting the print data on the storage device with a specified value.

17. The computer-readable medium as recited in claim 10, further comprising one or more additional instructions which, when executed by the one or more processors, causes the performance of:
    providing a storage unit identifier to the registration authority,
    receiving a registered identifier value from the registration authority, and
    storing the registered identifier value.

18. An apparatus for managing print data on a printing device, the apparatus comprising a memory storing instructions which, when executed by one or more processors, causes the performance of the steps of:
    receiving print data at the printing device;
    causing the print data to be stored on a storage device at the printing device;

the printing device retrieving, from the print data, data that indicates a specified amount of time that the print data is to be stored on the storage device at the printing device;

the printing device determining whether the print data has been stored on the storage device at the printing device for at least the specified amount of time; and if the print data has been stored on the storage device at the printing device for at least the specified amount of time, then causing the print data to be deleted from the storage device at the printing device.

19. The apparatus as recited in claim 18, wherein the memory further includes one or more additional instructions which, when executed by the one or more processors, causes the performance of examining data contained in the print data that indicates the specified amount of time.

20. The apparatus as recited in claim 18, wherein the memory further includes one or more additional instructions which, when executed by the one or more processors, causes the performance of receiving and storing configuration data for the printing device that indicates the specified amount of time.

21. The apparatus as recited in claim 18, wherein determining whether the print data has been stored on the storage device for at least the specified amount of time includes comparing an expiration value associated with the print data to a current date/time value.

22. The apparatus as recited in claim 18, wherein the printing device is a multi-function peripheral.

23. The apparatus as recited in claim 18, wherein the memory further includes one or more additional instructions which, when executed by the one or more processors, causes the performance of examining a file directory entry associated with the data to determine the expiration value for the data.

24. The apparatus as recited in claim 18, wherein causing the print data to be deleted from the storage device includes overwriting the print data on the storage device with a specified value.

25. The apparatus as recited in claim 18, wherein the memory further includes one or more additional instructions which, when executed by the one or more processors, causes the performance of:

providing a storage unit identifier to the registration authority, receiving a registered identifier value from the registration authority, and storing the registered identifier value.

26. A method for managing print data on a printing device, the method comprising the steps of:

receiving print data at the printing device;

causing the print data to be stored on a storage device at the printing device;

determining whether the print data has been processed at the printing device at least a specified number of times; and if the print data has been processed at the printing device at least the specified number of times, then causing the print data to be deleted from the storage device.

27. The method as recited in claim 26, wherein each processing of the print data at the printing device includes printing one or more copies of an electronic document.

28. The method as recited in claim 26, further comprising examining data contained in the print data that indicates the specified number of times.

29. The method as recited in claim 26, further comprising examining configuration data for the printing device that indicates the specified number of times.

30. The method as recited in claim 26, further comprising receiving and storing configuration data for the printing device that indicates the specified number of times.

31. The method as recited in claim 26, wherein the printing device is a multi-function peripheral.

32. The method as recited in claim 26, wherein causing the print data to be deleted from the storage device includes overwriting the print data on the storage device with a specified value.

33. The method as recited in claim 26, further comprising:

encrypting the print data to generate encrypted print data; and storing the encrypted print data on the storage device.

34. The method as recited in claim 26, further comprising:

receiving an identifier uniquely associated with the print data;

receiving a delete command and the identifier; and in response to receiving the delete command, deleting the print data based upon the identifier.

35. A machine-readable medium for managing print data on a printing device, the machine-readable medium carrying instructions which, when executed by one or more processors, causes the performance of the steps of:

receiving print data at the printing device;

causing the print data to be stored on a storage device at the printing device;

determining whether the print data has been processed at the printing device at least a specified number of times; and if the print data has been processed at the printing device at least the specified number of times, then causing the print data to be deleted from the storage device.

36. The machine-readable medium as recited in claim 35, wherein each processing of the print data at the printing device includes printing one or more copies of an electronic document.

37. The machine-readable medium as recited in claim 35, further comprising one or more additional instructions which, when executed by the one or more processors, causes the performance of examining data contained in the print data that indicates the specified number of times.

38. The machine-readable medium as recited in claim 35, further comprising one or more additional instructions which, when executed by the one or more processors, causes the performance of examining configuration data for the printing device that indicates the specified number of times.

39. The machine-readable medium as recited in claim 35, further comprising one or more additional instructions which, when executed by the one or more processors, causes the performance of receiving and storing configuration data for the printing device that indicates the specified number of times.

40. The machine-readable medium as recited in claim 35, wherein the printing device is a multi-function peripheral.

41. The machine-readable medium as recited in claim 35, wherein causing the print data to be deleted from the storage device includes overwriting the print data on the storage device with a specified value.

42. The machine-readable medium as recited in claim 35, further comprising one or more additional instructions which, when executed by the one or more processors, causes the performance of:

encrypting the print data to generate encrypted print data; and storing the encrypted print data on the storage device.

43. The machine-readable medium as recited in claim 35, further comprising one or more additional instructions which, when executed by the one or more processors, causes the performance of:

receiving an identifier uniquely associated with the print data;

receiving a delete command and the identifier; and in response to receiving the delete command, deleting the print data based upon the identifier.

44. An apparatus for managing print data on a printing device, the apparatus comprising a memory storing instructions which, when executed by one or more processors, causes the performance of the steps of:

receiving print data at the printing device;

causing the print data to be stored on a storage device at the printing device;

determining whether the print data has been processed at the printing device at least a specified number of times; and if the print data has been processed at the printing device at least the specified number of times, then causing the print data to be deleted from the storage device.

45. The apparatus as recited in claim 44, wherein each processing of the print data at the printing device includes printing one or more copies of an electronic document.

46. The apparatus as recited in claim 44, wherein the memory further includes one or more additional instructions which, when executed by the one or more processors, causes the performance of examining data contained in the print data that indicates the specified number of times.

47. The apparatus as recited in claim 44, wherein the memory further includes one or more additional instructions which, when executed by the one or more processors, causes the performance of examining configuration data for the printing device that indicates the specified number of times.

48. The apparatus as recited in claim 44, wherein the memory further includes one or more additional instructions which, when executed by the one or more processors, causes the performance of receiving and storing configuration data for the printing device that indicates the specified number of times.

49. The apparatus as recited in claim 44, wherein the printing device is a multi-function peripheral.

50. The apparatus as recited in claim 44, wherein causing the print data to be deleted from the storage device includes overwriting the print data on the storage device with a specified value.

51. The apparatus as recited in claim 44, wherein the memory further includes one or more additional instructions which, when executed by the one or more processors, causes the performance of:

encrypting the print data to generate encrypted print data; and storing the encrypted print data on the storage device.

52. The apparatus as recited in claim 44, wherein the memory further includes one or more additional instructions which, when executed by the one or more processors, causes the performance of:

receiving an identifier uniquely associated with the print data;

receiving a delete command and the identifier; and in response to receiving the delete command, deleting the print data based upon the identifier.

53. An apparatus for managing print data on a printing device, the apparatus comprising:

one or more processors; and a memory storing instructions which, when executed by one or more processors, cause:

receiving print data at the printing device, at the printing device encrypting the print data to generate encrypted print data, causing the encrypted print data to be stored on a storage device at the printing device, receiving a specified amount of time at the printing device via a user interface of the printing device, the printing device determining whether the encrypted print data has been stored on the storage device at the printing device for at least the specified amount of time, and if the encrypted print data has been stored on the storage device at the printing device for at least the specified amount of time, then causing the encrypted print data to be deleted from the storage device at the printing device.

* * * * *